United States Patent
Hogge et al.

(10) Patent No.: US 10,150,009 B2
(45) Date of Patent: Dec. 11, 2018

(54) GOLF BALL INCORPORATING THIN MOISTURE BARRIER FILM HAVING LOW NORMALIZED MOISTURE VAPOR TRANSMISSION RATE

(71) Applicant: Acushnet Company, Fairhaven, MA (US)

(72) Inventors: Matthew F. Hogge, Plymouth, MA (US); Peter L. Serdahl, New Bedford, MA (US); Brian Comeau, Berkley, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 15/847,985

(22) Filed: Dec. 20, 2017

(65) Prior Publication Data

US 2018/0272194 A1    Sep. 27, 2018

Related U.S. Application Data

(63) Continuation-in-part of application No. 15/466,916, filed on Mar. 23, 2017, now Pat. No. 10,046,205.

(51) Int. Cl.
*A63B 37/00* (2006.01)
*A63B 37/02* (2006.01)
*C08L 23/08* (2006.01)
*C08L 23/06* (2006.01)

(52) U.S. Cl.
CPC ...... *A63B 37/0039* (2013.01); *A63B 37/0045* (2013.01); *A63B 37/0076* (2013.01); *A63B 37/0093* (2013.01); *C08L 23/06* (2013.01); *C08L 23/0823* (2013.01); *C08L 2205/02* (2013.01)

(58) Field of Classification Search
CPC ............ A63B 37/0039; A63B 37/0045; A63B 37/0093; C08F 10/02; C08F 210/02; C08L 23/0823
See application file for complete search history.

(56) References Cited

U.S. PATENT DOCUMENTS

| | | | |
|---|---|---|---|
| 5,820,488 A | 10/1998 | Sullivan et al. | |
| 5,875,891 A | 3/1999 | Snell | |
| 5,885,172 A | 3/1999 | Hebert et al. | |
| 6,132,324 A | 10/2000 | Hebert et al. | |
| 6,132,544 A | 10/2000 | Ihara | |
| 6,232,389 B1 | 5/2001 | Feeney et al. | |
| 6,267,693 B1 | 7/2001 | Sullivan | |
| 6,287,216 B1 * | 9/2001 | Boehm | A63B 37/08 473/354 |
| 6,336,871 B1 | 1/2002 | Ihara et al. | |
| 6,398,668 B1 | 6/2002 | Wai | |
| 6,494,792 B2 | 12/2002 | Sullivan | |
| 6,632,147 B2 | 10/2003 | Cavallaro et al. | |
| 6,806,347 B2 | 10/2004 | Hogge et al. | |
| 6,838,028 B2 | 1/2005 | Hogge et al. | |
| 6,932,720 B2 | 8/2005 | Hogge et al. | |
| 7,004,854 B2 | 2/2006 | Hogge et al. | |
| 7,004,855 B2 | 2/2006 | Jordan | |
| 7,182,702 B2 | 2/2007 | Hogge et al. | |
| 7,306,528 B2 | 12/2007 | Jordan | |
| 7,357,733 B2 | 4/2008 | Hogge et al. | |
| 8,303,436 B2 | 11/2012 | Sullivan et al. | |
| 8,454,455 B2 | 6/2013 | Cavallaro | |
| 8,703,283 B2 | 4/2014 | Goerlitz et al. | |
| 8,907,022 B2 | 12/2014 | Hayes et al. | |
| 9,108,082 B2 | 8/2015 | Kim et al. | |
| 9,393,462 B2 | 7/2016 | Farrell | |
| 9,427,629 B1 | 8/2016 | Binette et al. | |
| 9,433,826 B1 | 9/2016 | Comeau et al. | |
| 2003/0069082 A1 | 4/2003 | Sullivan | |
| 2003/0069085 A1 | 4/2003 | Hogge et al. | |
| 2003/0114247 A1 * | 6/2003 | Cavallaro | A63B 37/0003 473/357 |
| 2003/0130062 A1 | 7/2003 | Morgan et al. | |
| 2003/0224130 A1 * | 12/2003 | Goerlitz | B32B 27/12 428/34.2 |
| 2004/0147344 A1 | 7/2004 | Sullivan et al. | |
| 2004/0185963 A1 | 9/2004 | Hogge et al. | |
| 2006/0068938 A1 | 3/2006 | Sullivan | |
| 2006/0128505 A1 | 6/2006 | Sullivan et al. | |
| 2007/0015879 A1 | 1/2007 | Sullivan | |
| 2007/0129172 A1 | 6/2007 | Cavallaro | |
| 2008/0064528 A1 | 3/2008 | Jordan | |
| 2008/0261721 A1 | 10/2008 | Hogge et al. | |
| 2009/0020898 A1 * | 1/2009 | Goerlitz | C08L 23/0823 264/7 |
| 2009/0062036 A1 * | 3/2009 | Hebert | A63B 37/0003 473/377 |
| 2009/0169741 A1 | 7/2009 | Hogge | |
| 2010/0248862 A1 * | 9/2010 | Sullivan | A63B 37/0039 473/373 |
| 2013/0157779 A1 * | 6/2013 | Kim | A63B 37/0003 473/373 |

* cited by examiner

Primary Examiner — John E Simms, Jr.
(74) Attorney, Agent, or Firm — Margaret C. Baker

(57) ABSTRACT

Golf ball incorporating at least one very thin moisture barrier film (monolayer film, bi-layer film or multi-layer film) comprising ethylene-based cycloolefin copolymer(s) and having a thickness of up to 0.009 inches as well as a normalized moisture vapor transmission rate (nMVTR) of less than about 5.0 g/(m²·day). The ethylene-based cycloolefin copolymer-containing moisture barrier film is disposed about and adjacent to an outer surface of a subassembly and is surrounded by at least one outer layer having an nMVTR that is greater than that of the moisture barrier film. In particular embodiments, the nMVTR of the subassembly is also greater than that of the moisture barrier film.

7 Claims, No Drawings

GOLF BALL INCORPORATING THIN MOISTURE BARRIER FILM HAVING LOW NORMALIZED MOISTURE VAPOR TRANSMISSION RATE

CROSS-REFERENCE TO RELATED APPLICATIONS

This is a continuation-in-part of U.S. application Ser. No. 15/466,916, filed Mar. 23, 2017, the entire disclosure of which is hereby incorporated by reference herein in its entirety.

FIELD OF THE INVENTION

Durable golf balls incorporating thin moisture barrier film(s) having low normalized moisture vapor transmission rates.

BACKGROUND OF THE INVENTION

Conventional golf balls can be divided into two general classes: solid and wound. Solid golf balls include one-piece, two-piece (i.e., single layer core and single layer cover), and multi-layer (i.e., solid core of one or more layers and/or a cover of one or more layers) golf balls. Wound golf balls typically include a solid, hollow, or fluid-filled center, surrounded by a tensioned elastomeric material, and a cover.

Examples of golf ball materials range from rubber materials, such as balata, styrene butadiene, polybutadiene, or polyisoprene, to thermoplastic or thermoset resins such as ionomers, polyolefins, polyamides, polyesters, polyurethanes, polyureas and/or polyurethane/polyurea hybrids, and blends thereof. Typically, outer layers are formed about the spherical outer surface of an innermost golf ball layer via compression molding, casting, or injection molding.

From the perspective of a golf ball manufacturer, it is desirable to have materials exhibiting a wide range of properties, such as resilience, durability, spin, and "feel," because this enables the manufacturer to make and sell golf balls suited to differing levels of ability and/or preferences. In this regard, playing characteristics of golf balls, such as spin, feel, CoR and compression can be tailored by varying the properties of the golf ball materials and/or adding additional golf ball layers such as at least one intermediate layer disposed between the cover and the core. Intermediate layers can be of solid construction, and have also been formed of a tensioned elastomeric winding. The difference in play characteristics resulting from these different types of constructions can be quite significant.

A known problem with golf balls is that water vapor sometimes penetrates into golf ball materials, which can harmfully affect golf ball properties. For example, when a polybutadiene core cross-linked with peroxide and/or zinc diacrylate absorbs water, the core tends to lose resiliency, and the compression and coefficient of restitution (CoR) of the ball may change.

Typically, at 38° C. and 90% humidity over a sixty day period, significant amounts of moisture can enter the cores and reduce the initial velocity of the balls by 1.8 ft/s to 4.0 ft/s or greater. The change in compression may vary from about 5 PGA to about 10 PGA or greater. The absorbed water vapor also reduces the golf ball CoR. When a golf ball is subjected to prolonged storage and/or use under ambient conditions such as 25-35% RH, as well as conditions of high temperature and high humidity, the CoR of the golf ball tends to decrease over time due to water vapor absorption. Unfortunately, at least some widely used polyurethane cover materials also tend to be vulnerable to moisture penetration, and therefore can't adequately protect the core.

The industry has addressed such problems by applying a moisture barrier layer over a golf ball material that would otherwise be vulnerable to water penetration. In this regard, an effective moisture barrier layer has a moisture vapor transmission rate (MVTR) that is low enough to create a barrier against moisture penetration into the enveloped material and thereby protect the material against the negative effects of water.

It has been determined that in many golf balls, the moisture barrier layer should be as thin as is possible in order to avoid compromising other important golf ball properties such as CoR, durability, and compression or unnecessarily increasing manufacturing costs. To date, injection molding very thin layers of moisture barrier material has undesirably tended to create non-concentric, non-conformal layers containing pin holes and having non-uniform thicknesses, each which can produce undesirable performance characteristics and/or present durability issues.

Accordingly, coating layers of moisture barrier material have also been explored, but can present layer thickness uniformity issues, as well as adhesion and durability problems when air pockets formed at an interface between the coating material and adjacent inner layer. In this regard, prior thin moisture barrier coating layers of nano-composite filled elastomeric coatings containing exfoliated platelet particles or a specialized low transmission polymer such as polyvinylidene chloride ("PVDC") have displayed inter-layer adhesion problems, durability issues, resilience deficiency, and loss of barrier effectiveness when the moisture barrier coating layer cracks due to impact by a golf club. The barrier properties of PVDC coatings are typically best at or below ambient (room) temperature (~68-77° F.), but degrade rapidly at elevated temperatures.

Thus, golf ball manufacturers have instead tried incorporating thin films of moisture barrier material in golf ball constructions. For example, very thin metallic film layers have been incorporated for this purpose. See, e.g., U.S. Pat. No. 9,433,826 of Comeau et al. However, a catalytic coating pre-treatment is generally needed in connection with such films, which can complicate as well as add to the cost of golf ball manufacture. In a different approach, flat ionomer resin film sheets having a thicknesses of from 10 microns (um) to less than 300 um were compression molded about a ball body while dimples were also being formed in the resin. However, there was no way to prevent the resin sheets of moisture barrier material from overlapping in some areas on the ball body surface during the heat compression molding process, which tended therefore to produce non-uniformity in the resulting film layer and adhesion issues between the film and encased ball body at an interface there between.

In an alternative approach, very thin ionomer sheet blanks were vacuum-suctioned into and within inner faces of concave hemispherical cup-shaped half-shell molds. Preformed half shells of thin moisture barrier film were thereby produced having a thickness of no greater than 1.5 mm, but durability issues could arise because this method permitted the outer diameter and shape of the resulting pre-formed cup-shaped half-shell films to differ from the diameter and shape of the inner face of the mold which could result in gaps between the cup-shaped films and an encased core/subassembly since the contour of the film pre-form did not always match the contour of the encased core/subassembly.

Meanwhile, a major challenge encountered with incorporating thin film moisture barrier layers in golf ball constructions is achieving excellent normalized MVTR (nMVTR) criteria while still producing a material able to withstand the degree of elongation sufficient for sustaining the tremendous force of a golf club face striking the golf ball. Normalized MVTRs compare the ability of materials to resist moisture penetration irrespective of the thickness of the material and can be determined by the equation VTR(g·mm/m$^2$·day)·(1/thickness (mm)) or g/(m$^2$·day). For example, ionomers typically have an nMVTR of from 9 to 12 g/(m$^2$·day), which is better than that of thermoset and thermoplastic polyurethanes, but still not ideal. And while polyvinylidene chloride coatings can demonstrate nMVTRs in the range of 3.9 to 6.3 g/(m$^2$·day), such coatings generally have the limitations of coatings discussed above.

In this regard, related U.S. application Ser. No. 15/466,916 of Hogge discloses golf balls incorporating at least one very thin thermoformed moisture barrier film layer having an nMVTR of less than 4.0 g/(m$^2$·day) and a continuous and substantially uniform thermoformed thickness. First and second heat-induced pre-form half shells have first and second inner surfaces that are sized and shaped and contoured to receive and conformally and adhesively mate onto and about the subassembly—which results in a finished golf ball wherein the very thin thermoformed moisture barrier film layer has a uniform thickness and excellent adhesion with adjacent inner and outer conventional golf ball layers.

However, there is still a need for golf balls including more flexible moisture barrier films that have comparably low nMVTRs yet can be incorporated in a wide range of golf ball constructions durably via any of vacuum forming, compression molding, and/or thermoforming—without meanwhile changing important characteristics of the golf ball. Such golf balls and methods of making the golf balls would be useful and desirably cost effective. Golf balls of the invention and methods of making golf balls of the invention address and solve these needs.

SUMMARY OF THE INVENTION

Advantageously, golf balls of the invention incorporate moisture barrier films comprising ethylene-based cycloolefin copolymer(s) as defined herein below which can be incorporated in a wide range of golf ball constructions durably via known processes such as vacuum forming, compression molding, and/or thermoforming without meanwhile negatively impacting or otherwise changing targeted playing characteristics of the golf ball. A golf ball of the invention includes at least one moisture barrier film having a thickness of up to 0.009 inches, an nMVTR of less than about 5.0 g/(m$^2$·day), and comprised of ethylene-based cycloolefin copolymer(s).

In one embodiment, a golf ball of the invention comprises: a subassembly; a moisture barrier monolayer film having a thickness of up to 0.009 inches disposed about and adjacent to an outer surface of the subassembly and comprising an ethylene-based cycloolefin copolymer; and at least one outer layer disposed about an outer surface of the moisture barrier monolayer film and having a normalized moisture vapor transmission rate (nMVTR) that is greater than a moisture vapor transmission rate of the moisture barrier monolayer film.

The ethylene-based cycloolefin copolymer may be blended with at least one thermoset or thermoplastic polymer. The thermoset or thermoplastic polymer may be selected from the group consisting of maleic anhydride grafted polyolefins, high density polyethylenes, low density polyethylenes, very low density polyethylenes, ethylene-vinyl acetates, polypropylenes, polyamides, polyesters, ethylene vinyl acetates, polyvinylidene chlorides, polychlorotrifluoroethylenes, thermoplastic polyurethanes, and thermoset urethanes, thermoset rubbers, and combinations thereof.

The thermoset or thermoplastic polymer is included in an amount not greater than 35% by weight based on the total weight of the blend. In one such embodiment, the thermoset or thermoplastic polymer is included in an amount of from about 1% to about 35% by weight based on the total weight of the blend. In another such embodiment, the thermoset or thermoplastic polymer is included in an amount of from about 10% to about 30% by weight based on the total weight of the blend.

A blend of the ethylene-based cycloolefin copolymer and the at least one thermoset or thermoplastic polymer may have an nMVTR$_B$ that is lower than an nMVTR of the at least one thermoset or thermoplastic polymer. In one embodiment, nMVTR$_B$ is greater than nMVTR by from 0.20 g/(m$^2$·day)-0.50 g/(m$^2$·day).

In a specific embodiment, the ethylene-based cycloolefin copolymer is blended with at least one linear low density polyethylene.

In a particular embodiment, the outer layer is a cover, and the subassembly is a core having an nMVTR that is greater than the nMVTR of the moisture barrier monolayer film.

The moisture barrier film layer has a thickness of from about 0.001 inches to about 0.007 Inches, and an nMVTR of less than about 5.0 g/(m$^2$·day).

In a different embodiment, a golf ball of the invention comprises: a subassembly; a moisture barrier bi-layer film having a thickness of up to 0.009 inches disposed about and adjacent to an outer surface of the subassembly. At least one of the film layers of the moisture barrier bi-layer film comprises an ethylene-based cycloolefin copolymer. At least one outer layer is disposed about an outer surface of the moisture barrier bi-layer film and has a normalized moisture vapor transmission rate (nMVTR) that is greater than an nMVTR of the moisture barrier bi-layer film.

In one such embodiment, an inner film layer of the moisture barrier bi-layer film, adjacent the subassembly, comprises the ethylene-based cycloolefin copolymer; and an outer film layer of the moisture barrier bi-layer film comprises a different ethylene-based cycloolefin copolymer than the at least one ethylene-based cycloolefin copolymer of the inner film layer.

In another such embodiment, an inner film layer of the moisture barrier bi-layer film, adjacent the subassembly, comprises the ethylene-based cycloolefin copolymer; and an outer film layer of the moisture barrier bi-layer film comprises a thermoplastic or thermoset polymer that does not comprise an ethylene-based cycloolefin copolymer.

In some embodiments of the bi-layer film construction, the ethylene-based cycloolefin copolymer may be blended with at least one thermoset or thermoplastic polymer. Once again, the thermoset or thermoplastic polymer may be selected from the group consisting of maleic anhydride grafted polyolefins, high density polyethylenes, low density polyethylenes, very low density polyethylenes, ethylene-vinyl acetates, polypropylenes, polyamides, polyesters, ethylene vinyl acetates, polyvinylidene chlorides, polychlorotrifluoroethylenes, thermoplastic polyurethanes, thermoset urethanes, thermoset rubbers, and combinations thereof.

In one such embodiment, the thermoset or thermoplastic polymer is included in an amount no greater than 35 wt % by weight based on the total weight of the blend. In another such embodiment, the thermoset or thermoplastic polymer is included in an amount of from about 1% to about 35% by weight based on the total weight of the blend. In yet another such embodiment, the thermoset or thermoplastic polymer is included in an amount of from about 10% to about 30% by weight based on the total weight of the blend.

The blend of ethylene-based cycloolefin copolymer and the at least one thermoset or thermoplastic polymer has an nMVTR$_B$ that is lower than the nMVTR of the at least one thermoset or thermoplastic polymer. In one embodiment, nMVTR$_B$ is greater than nMVTR by from 0.20 g/(m$^2$·day)- 0.50 g/(m$^2$·day).

In a particular embodiment, the outer layer is a cover, and the subassembly is a core having an nMVTR that is greater than the nMVTR of the moisture barrier bi-layer film.

The moisture barrier bi-layer film has an nMVTR of less than about 5.0 g/(m$^2$·day).

In a specific embodiment, the moisture barrier bi-layer film has a thickness of from about 0.001 inches to about 0.007 inches.

In a further specific embodiment, the ethylene-based cycloolefin copolymer is blended with at least one linear low density polyethylene.

In an alternative embodiment, a golf ball of the invention comprises: a subassembly; a moisture barrier multi-layer film having a thickness of up to 0.009 inches disposed about and adjacent to an outer surface of the subassembly; wherein at least one film layer comprises an ethylene-based cycloolefin copolymer. At least one outer layer is disposed about an outer surface of the moisture barrier multi-layer film and has an nMVTR that is greater than a moisture vapor transmission rate of the moisture barrier multi-layer film.

In one embodiment, the moisture barrier multi-layer film has three film layers, wherein an intermediate film layer of the multi-layer film comprises the ethylene-based cycloolefin copolymer.

As in the monolayer and bi-layer film construction, the ethylene-based cycloolefin copolymer may be blended with at least one of a thermoset and thermoplastic polymer selected from the group consisting of maleic anhydride grafted polyolefins, high density polyethylenes, low density polyethylenes, very low density polyethylenes, ethylene-vinyl acetates, polypropylenes, polyamides, polyesters, ethylene vinyl acetates, polyvinylidene chlorides, polychlorotrifluoroethylenes, thermoplastic polyurethanes, thermoset urethanes, thermoset rubbers, and combinations thereof.

In a particular such embodiment, the film layer comprising an ethylene-based cycloolefin copolymer is disposed between an inner film layer, adjacent the subassembly, and an outer film layer, disposed about the intermediate film layer, wherein each of the inner film layer and outer film layer comprises at least one of a thermoset or thermoplastic composition. In a further such embodiment, at least one of the inner film layer and outer film layer may comprise a blend of the thermoset or thermoplastic composition and an ethylene-based cycloolefin copolymer.

In one embodiment, the outer layer is a cover, and the subassembly is a core having an nMVTR that is greater than the nMVTR of the moisture barrier multi-layer film.

The moisture barrier multi-layer film has an nMVTR of less than about 5.0 g/(m$^2$·day).

In a specific such embodiment, the ethylene-based cycloolefin copolymer is blended with at least one linear low density polyethylene.

In a different embodiment, the moisture barrier multi-layer film comprises up to five film layers, wherein adjacent film layers comprise at least one different ingredient.

In one specific construction, the moisture barrier multi-layer film comprises five film layers, wherein a first film layer consists of a linear low density polyethylene composition, the second film layer comprises at least one of an ethylene vinyl acetate composition and a polyvinylidene chloride composition, the third film layer comprises at least one ethylene-based cycloolefin copolymer, the fourth film layer comprises at least one of an ethylene vinyl acetate composition and polyvinylidene chloride composition, and a fifth film layer consists of a linear low density polyethylene composition.

DETAILED DESCRIPTION OF THE INVENTION

A golf ball of the invention includes at least one moisture barrier film having a thickness of no greater than 0.009 inches, an nMVTR that is less than about 5.0 g/(m$^2$·day), and is comprised of ethylene-based cycloolefin copolymer(s). The moisture barrier film can be incorporated in a wide range of different golf ball constructions durably via numerous different known processes such as vacuum forming, compression molding, and/or thermoforming—thereby reducing manufacturing costs without meanwhile changing the targeted playing characteristics of the golf ball.

In contrast to ionomers, the moisture barrier films of golf balls of the invention have desirably low moisture vapor transition rates at diminished thickness, and yet possess the necessary elongation (reduced brittleness and modulus) to remain in-tact and without fracture under the great force of repeated blows on the course, and without meanwhile changing important golf ball properties such as CoR, durability, and compression.

Moisture barrier films of golf balls of the invention may be monolayer, bi-layer (two film layers are co-extruded or otherwise formed about a golf ball subassembly), or multi-layer (the film includes three or more film layers). As used herein, the term "moisture barrier film" is used interchangeably with "thin moisture barrier film" and "very thin moisture barrier film" when referring to a moisture barrier monolayer film, a moisture barrier bi-layer film, and/or or a moisture barrier multi-layer film. And while the respective film layers of a particular bi-layer or multi-layer film often differ in some respect, benefits have also been recognized when identical film layers comprising ethylene-based cycloolefin copolymer are co-extruded and form the moisture barrier film of a golf ball of the invention.

In one specific embodiment, a golf ball of the invention comprises: a subassembly; a moisture barrier monolayer film having a thickness of up to 0.009 inches disposed about and adjacent to an outer surface of the subassembly and comprising an ethylene-based cycloolefin copolymer; and at least one outer layer disposed about an outer surface of the moisture barrier monolayer film and having a normalized moisture vapor transmission rate (nMVTR) that is greater than a moisture vapor transmission rate of the moisture barrier monolayer film. In one such embodiment, the outer layer is a cover, and the subassembly is a core having an nMVTR that is greater than the nMVTR of the moisture barrier monolayer film.

Suitable ethylene-based cycloolefin copolymers for the very thin moisture barrier films of the invention comprise cycloolefin copolymer and from 1 to 10% by weight of polyethylene based on the total weight of the blend. Such ethylene-based cycloolefin copolymers have a linear structure rather than being composed of stacked units of cycloolefin polymer, which synergistically imparts sufficient elongation to the resulting thin moisture barrier film to withstand the great force and impact of a club face striking the golf ball on the course without separating from adjacent layers or fracturing.

In another specific embodiment, a golf ball of the invention comprises: a subassembly; a moisture barrier bi-layer film having a thickness of up to 0.009 inches disposed about and adjacent to an outer surface of the subassembly. At least one of the film layers of the moisture barrier bi-layer film comprises an ethylene-based cycloolefin copolymer. At least one outer layer is disposed about an outer surface of the moisture barrier bi-layer film and has a nMVTR that is greater than an nMVTR of the moisture barrier bi-layer film.

In one such embodiment, an inner film layer of the moisture barrier bi-layer film, adjacent the subassembly, comprises the ethylene-based cycloolefin copolymer; and an outer film layer of the moisture barrier bi-layer film comprises the same or a different ethylene-based cycloolefin copolymer than the at least one ethylene-based cycloolefin copolymer of the inner film layer.

In another such embodiment, an inner film layer of the moisture barrier bi-layer film, adjacent the subassembly, comprises the ethylene-based cycloolefin copolymer; and an outer film layer of the moisture barrier bi-layer film comprises a thermoplastic or thermoset polymer that does not comprise an ethylene-based cycloolefin copolymer.

In a particular such embodiment, the outer layer is a cover, and subassembly is a core having an nMVTR that is greater than the nMVTR of the moisture barrier bi-layer film.

In a different embodiment, a golf ball of the invention comprises: a subassembly; a moisture barrier multi-layer film having a thickness of up to 0.009 inches disposed about and adjacent to an outer surface of the subassembly; wherein at least one film layer comprises an ethylene-based cycloolefin copolymer. At least one outer layer is disposed about an outer surface of the moisture barrier multi-layer film and has an nMVTR that is greater than a moisture vapor transmission rate of the moisture barrier multi-layer film.

In one such embodiment, the moisture barrier multi-layer film has three film layers, and an intermediate film layer comprises the ethylene-based cycloolefin copolymer.

In a particular such embodiment, the moisture barrier film layer comprising an ethylene-based cycloolefin copolymer is disposed between an inner film layer, adjacent the subassembly, and an outer film layer, disposed about the intermediate film layer, wherein each of the inner film layer and outer film layer comprises at least one of a thermoset or thermoplastic composition.

In a further particular such embodiment, at least one of the inner film layer and outer film layer comprises a blend of thermoset or thermoplastic composition and an ethylene-based cycloolefin copolymer. In yet another embodiment, each of the inner film layer, outer film layer, and intermediate film layer of the moisture barrier multi-layer film comprises ethylene-based cycloolefin copolymer(s). The ethylene-based cycloolefin copolymer(s) of the three film layers may be substantially similar of differ.

In another specific embodiment, the moisture barrier multi-layer film consists of five film layers, wherein a first film layer consists of a linear low density polyethylene composition, the second film layer consists of an ethylene vinyl acetate composition, the third film layer comprises at least one ethylene-based cycloolefin copolymer, the fourth film layer consists of an ethylene vinyl acetate composition, and a fifth film layer consists of a linear low density polyethylene composition. In yet another specific construction, the moisture barrier multi-layer film comprises five film layers, wherein a first film layer consists of a linear low density polyethylene composition, a second film layer composition consists of ethylene vinyl acetate, a third film layer consists of ethylene-based cycloolefin copolymer, a fourth film layer consists of an ethylene vinyl acetate composition, and a fifth film layer consists of a linear low density polyethylene composition. In still another such embodiment, the moisture barrier multi-layer film comprises a sixth film layer of polyvinylidene chloride composition which may be positioned adjacent the film layer ethylene-based cycloolefin copolymer or between a layer of linear low density polyethylene composition and a layer of ethylene-based cycloolefin copolymer. In one such embodiment, the outer layer is a cover, and the subassembly is a core having an nMVTR that is greater than the nMVTR of the moisture barrier multi-layer film.

In a golf ball of the invention, a given layer of moisture vapor barrier film may include up to 100% by weight of ethylene-based cycloolefin copolymer(s) based on the total weight of the film layer material. Specific examples of particularly suitable ethylene-based cycloolefin copolymer(s) for moisture barrier films of golf balls of the invention are disclosed and discussed in U.S. Pat. No. 8,703,283 of Goerlitz et al. ("'283 patent"), hereby incorporated by reference herein in its entirety. For example, cycloolefin copolymer(s) may comprise polymerized units derived from at least one polycyclic olefin having a general formula selected from the group consisting of I, II, II', III, IV, V and/or VI, below, in an amount of from about 0.1% to 100.0% by weight based on the total weight of the cycloolefin copolymer.

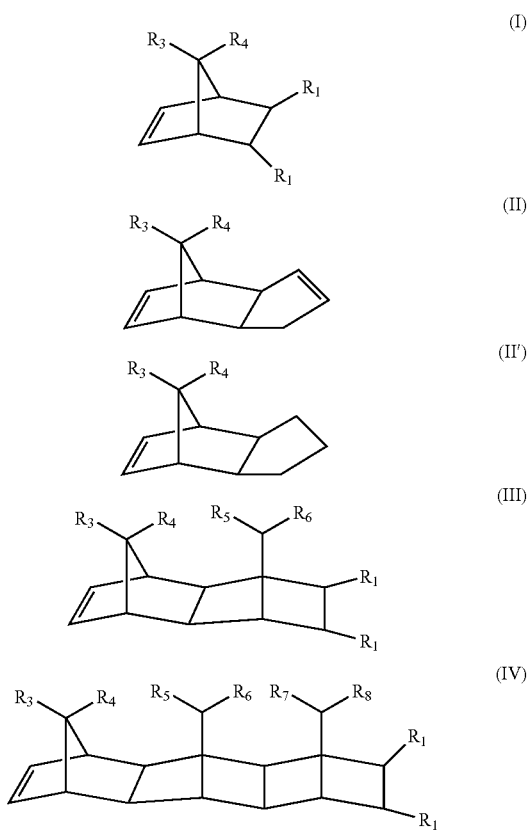

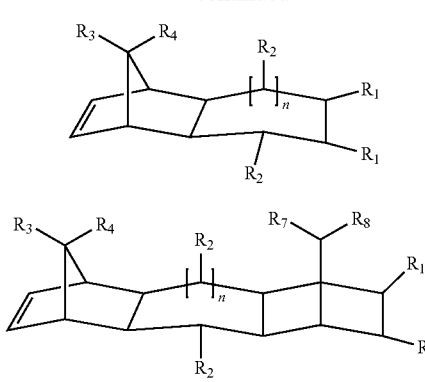

In these general formulas, $R^1$, $R^2$, $R^3$, $R^4$, $R^5$, $R^6$, $R^7$, $R^8$ are identical or different, and are a hydrogen atom or a $C_1$-$C_{20}$ hydrocarbon radical, such as a linear or branched $C_1$-$C_8$-alkyl radical, $C_6$-$C_{18}$-aryl radical, $C_7$-$C_{20}$-alkylenearyl radical, or a cyclic or acyclic $C_2$-$C_{20}$ alkenyl radical, or form a saturated, unsaturated or aromatic ring, where identical radicals $R^1$ to $R^8$ in the various formulas I to VI can have a different meaning, and in which n can assume values from 0 to 5, and from 0 to 99.9% by weight, preferably from 0.1 to 99.9% by weight, in particular from 0.5 to 80% by weight, based on the total weight of the cycloolefin copolymer, of polymerized units which derive from one or more acyclic olefins of the formula VII:

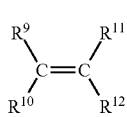

in which $R^9$, $R^{10}$, $R^{11}$, and $R^{12}$ are identical or different and are a hydrogen atom or a linear, branched, saturated or unsaturated $C_1$-$C_{20}$ hydrocarbon radical, such as a $C_1$-$C_8$-alkyl radical or a $C_6$-$C_{18}$-aryl radical.

In one preferred embodiment, the cycloolefin copolymers used can contain from 0 to 45% by weight, preferably from 0.1 to 40% by weight, based on the total weight of the cycloolefin copolymer, of polymerized units which derive from one or more monocyclic olefins of the formula VIII:

in which m is a number from 2 to 10.

The cycloolefin units may also include derivatives of the cyclic olefins such as those having polar groups, for example, halogen, hydroxy, ester, alkoxy, carboxy, cyano, amido, imido or silyl groups.

A particularly preferred cycloolefin copolymer for use in a thin moisture barrier film of a golf ball of the invention is composed of ethylene and norbornene.

A given moisture vapor barrier film (monolayer film, bi-layer film and/or multi-layer film) of a golf ball of the invention may alternatively comprise a blend of the ethylene-based cycloolefin copolymer(s) and at least one thermoset or thermoplastic polymer. The thermoset or thermoplastic polymer may be selected from the group consisting of maleic anhydride grafted polyolefins, high density polyethylenes, low density polyethylenes, very low density polyethylenes, ethylene-vinyl acetates, polypropylenes, polyamides, polyesters, ethylene vinyl acetates, polyvinylidene chlorides, polychlorotrifluoroethylenes, thermoplastic polyurethanes, and thermoset urethanes, thermoset rubbers, and combinations thereof.

In a specific embodiment, the thermoplastic polymer is at least one linear low density polyethylene (LLDPE). LLDPE is made from the monomer ethylene, being a substantially linear polymer (polyethylene), with significant numbers of short branches, commonly made by copolymerization of ethylene with longer-chain olefins. LLDPE differs structurally from conventional low-density polyethylene (LDPE) because of the absence of long chain branching. The linearity of LLDPE results from the different manufacturing processes of LLDPE and LDPE. In general, LLDPE is produced at lower temperatures and pressures by copolymerization of ethylene and higher alpha-olefins such as butene, hexene, and/or octene. The copolymerization process produces an LLDPE polymer that has a narrower molecular weight distribution than conventional LDPE and in combination with the linear structure, significantly different rheological properties.

In each of a monolayer film, bi-layer film and/or multi-layer film, the thermoset or thermoplastic polymer is included in an amount not greater than 35% by weight based on the total weight of the blend, or in an amount up to about 35% by weight based on the total weight of the blend, or in an amount of 35% by weight or less based on the total weight of the blend, or in an amount of from about 1% to about 35% by weight based on the total weight of the blend, or in an amount of 30% by weight or less based on the total weight of the blend, or in an amount of from about 1% to about 30% by weight based on the total weight of the blend, or in an amount of 25% by weight or less based on the total weight of the blend, or in an amount of from about 1% to about 25% by weight based on the total weight of the blend, or in an amount of 20% by weight or less based on the total weight of the blend, or in an amount of from about 1% to about 20% by weight based on the total weight of the blend, or in an amount of 10% by weight or less based on the total weight of the blend, or in an amount of from about 1% to about 10% by weight of the total weight based on the total weight of the blend, or in an amount of from about 5% to about 35% by weight based on the total weight of the blend, or in an amount of from about 5% to about 25% by weight based on the total weight of the blend, or in an amount of from about 5% to about 15% by weight based on the total weight of the blend, or in an amount of from about 10% to about 35% by weight based on the total weight of the blend, or in an amount of from about 10% to about 25% by weight based on the total weight of the blend, or in an amount of from about 10% to about 15% by weight based on the total weight of the blend, or in an amount of from about 15% to about 35% by weight based on the total weight of the blend, or in an amount of from about 20% to about 35% by weight based on the total weight of the blend, or in an amount of from about 25% to about 35% by weight based on the total weight of the blend, or in an amount of from about 30% to about 35% by weight based on the total weight of the blend.

In each of a monolayer film, bi-layer film and/or multi-layer film, a blend of the ethylene-based cycloolefin copolymer and the at least one thermoset or thermoplastic polymer may have an $nMVTR_B$ that is lower than an nMVTR of the at least one thermoset or thermoplastic polymer. In one embodiment, $nMVTR_B$ is greater than nMVTR by from 0.20 g/(m²·day)-0.50 g/(m²·day).

It is contemplated that a moisture barrier multi-layer film may comprise any number of possible film layers such as up to five film layers, six film layers and/or seven film layers. In some embodiments, adjacent film layers may comprise at least one different ingredient. In other embodiments, at least two adjacent film layers of the moisture barrier multi-layer film may be substantially similar.

Unless otherwise specified, the term "thickness" as used herein, refers to the overall thickness of a resulting moisture barrier monolayer film, bi-layer film and/or multi-layer film (referred to herein collectively as "moisture barrier film"). Thus, a moisture barrier film of a golf ball of the invention has a thickness of up to 0.009 inches, and in some embodiments, a thickness of up to about 0.008 inches, or a thickness of up to about 0.007 inches, or a thickness of up to about 0.006 inches, or a thickness of up to about 0.005 inches, or a thickness of up to about 0.004 inches, or a thickness of up to about 0.003 inches, or a thickness of up to about 0.002 inches, or a thickness of in the range of about 0.001 inches.

In one particular embodiment, the moisture barrier film has a thickness of from about 0.001 inches to 0.009 inches, or a thickness of from about 0.002 inches to 0.009 inches, or a thickness of from about 0.003 inches to 0.009 inches, or a thickness of from about 0.004 inches to 0.009 inches, or a thickness of from about 0.005 inches to 0.009 inches, or a thickness of from about 0.006 inches to 0.009 inches, or a thickness of from about 0.007 inches to 0.009 inches.

In other embodiments, the moisture barrier film has a thickness of from about 0.001 inches to 0.009 inches, or a thickness of from about 0.001 inches to about 0.008 inches, or a thickness of from about 0.001 inches to about 0.007 inches, or a thickness of from about 0.001 inches to about 0.006 inches, or a thickness of from about 0.001 inches to about 0.005 inches, or a thickness of from about 0.001 inches to about 0.004 inches, or a thickness of from about 0.001 inches to about 0.003 inches.

In yet other embodiments, the moisture barrier film has a thickness of from about 0.002 inches to about 0.008 inches, or a thickness of from about 0.002 inches to about 0.007 inches, or a thickness of from about 0.002 inches to about 0.006 inches, or a thickness of from about 0.002 inches to 0.005 inches, or a thickness of from about 0.002 inches to 0.004 inches.

In still other embodiments, the moisture barrier film has a thickness of from about 0.003 inches to about 0.008 inches, or a thickness of from about 0.003 inches to about 0.007 inches, or a thickness of from about 0.003 inches to about 0.006 inches, or a thickness of from about 0.003 inches to 0.005 inches.

In alternative embodiments, the moisture barrier film has a thickness of from about 0.004 inches to about 0.008 inches, or a thickness of from about 0.004 inches to about 0.007 inches, or a thickness of from about 0.004 inches to about 0.006 inches.

In alternative embodiments, the moisture barrier film has a thickness of from about 0.005 inches to about 0.008 inches, or a thickness of from about 0.005 inches to about 0.007 inches.

In other alternative embodiments, the moisture barrier film has a thickness of from about 0.006 inches to about 0.008 inches.

In embodiments wherein the moisture barrier film is bi-layer film or multi-layer film, each respective film layer of a bi-layer moisture barrier film or multi-layer moisture barrier film can have any thickness as long as the overall thickness of the bi-layer film or multi-layer film is not more than 0.009 inches.

Desirably, the moisture barrier film has an nMVTR of less than about 5.0 g/(m²·day). Alternatively, the moisture barrier monolayer film has an nMVTR of less than 5.0 g/(m²·day).

In other embodiments, the moisture barrier film has an nMVTR of up to about 5.0 g/(m²·day), or up to 5.0 g/(m²·day), or up to about 4.0 g/(m²·day), or up to 4.0 g/(m²·day), or up to about 3.0 g/(m²·day), or up to 3.0 g/(m²·day), or up to about 2.0 g/(m²·day), or up to 2.0 g/(m²·day), or up to about 1.0 g/(m²·day), or up to 1.0 g/(m²·day).

In yet other embodiments, the moisture barrier film has an nMVTR of between about 4.0 g/(m²·day) and about 5.0 g/(m²·day), or between 4.0 g/(m²·day) and 5.0 g/(m²·day), or between about 3.0 g/(m²·day) and about 5.0 g/(m²·day), or between 3.0 g/(m²·day) and 5.0 g/(m²·day), or between about 2.0 g/(m²·day) and about 5.0 g/(m²·day), or between 2.0 g/(m²·day) and 5.0 g/(m²·day), or between about 1.0 g/(m²·day) and about 5.0 g/(m²·day), or between 1.0 g/(m²·day) and 5.0 g/(m²·day), or between about 1.0 g/(m²·day) and about 4.0 g/(m²·day), or between 1.0 g/(m²·day) and 4.0 g/(m²·day), or between about 1.0 g/(m²·day) and about 3.0 g/(m²·day), or between 1.0 g/(m²·day) and 3.0 g/(m²·day), or between about 1.0 g/(m²·day) and about 2.0 g/(m²·day), or between 1.0 g/(m²·day) and 2.0 g/(m²·day), or between about 2.0 g/(m²·day) and about 4.0 g/(m²·day), or between 2.0 g/(m²·day) and 4.0 g/(m²·day), or between about 2.0 g/(m²·day) and about 3.0 g/(m²·day), or between 2.0 g/(m²·day) and 3.0 g/(m²·day), or between about 3.0 g/(m²·day) and about 4.0 g/(m²·day), or between 3.0 g/(m²·day) and 4.0 g/(m²·day).

In still other embodiments, the moisture barrier film has an nMVTR of up to about 5.0 g/(m²·day), or up to 5.0 g/(m²·day), or up to about 4.0 g/(m²·day), or up to 4.0 g/(m²·day), or up to about 3.0 g/(m²·day), or up to 3.0 g/(m²·day), or up to about 2.0 g/(m²·day), or up to 2.0 g/(m²·day), or up to about 1.0 g/(m²·day), or up to 1.0 g/(m²·day).

Moreover, in particular embodiments, the moisture barrier film has an nMVTR of from about 0.10 g/(m²·day) to 1.0 g/(m²·day), or from about 0.10 g/(m²·day) to 0.90 g/(m²·day), or from about 0.10 g/(m²·day) to 0.80 g/(m²·day), or from about 0.20 g/(m²·day) to 0.90 g/(m²·day), or from about 0.20 g/(m²·day) to 0.80 g/(m²·day), or from about 0.30 g/(m²·day) to 0.80 g/(m²·day), or from about 0.40 g/(m²·day) to 0.80 g/(m²·day).

Without being bound to a particular theory, interactions between innermost and outermost surfaces of a resulting moisture barrier film and adjacent layer surfaces produces/creates strong adhesion there between which translates to excellent golf ball durability against the great force and impact of a club face striking the golf ball. The degree of adhesion produced between the film layer and adjacent layers at interfaces there between may be evaluated, for example, using a physical Peel Test.

In this regard, a strip of approximately ½ inch may be cut around an equator of the golf ball, deep enough to cut through the entire layer to be tested. Next, a perpendicular cut may be made across the strip and one end of the strip may be peeled back just enough to make a tab of about ½ inch. The ball may then be clamped into a jig by poles with the tab facing upward. The jig allows the clamped ball to freely rotate about an axis parallel to the poles. The tab is then clamped to a 20 lb. load cell of a universal testing machine. The tab may then be pulled away from the ball at a rate of 0.5 in./min., and the force required to pull the outer layer off of the underlying layer is recorded.

In one embodiment, an adhesive strength between the moisture barrier film and an adjacent inner layer is at least about 1.1 lb/in, or greater than 2 lb/in. In another embodiment, an adhesive strength between the moisture barrier film and an adjacent inner layer is about 5 lb/in or greater. In yet another embodiment, an adhesive strength between the moisture barrier film and an adjacent inner layer is about 10 lb/in or greater. In still another embodiment, an adhesive strength between the moisture barrier film and an adjacent inner layer is about 15 lb/in or greater. In an alternative embodiment, an adhesive strength between the moisture barrier film and an adjacent inner layer is about 20 lb/in or greater. In a different embodiment, an adhesive strength between the moisture barrier film and an adjacent inner layer is greater than 25 lb/in, or greater than 30 lb/in.

In one embodiment, an adhesive strength between the moisture barrier film and an adjacent outer layer is greater than 2 lb/in. In another embodiment, an adhesive strength between the moisture barrier film and an adjacent outer layer is about 5 lb/in or greater. In yet another embodiment, an adhesive strength between the moisture barrier film and an adjacent outer layer is about 10 lb/in or greater. In still another embodiment, an adhesive strength between the moisture barrier film and an adjacent outer layer is about 15 lb/in or greater. In an alternative embodiment, an adhesive strength between the moisture barrier film and an adjacent outer layer is about 20 lb/in or greater. In a different embodiment, an adhesive strength between the moisture barrier film and an adjacent outer layer is greater than 25 lb/in, or greater than 30 lb/in.

Meanwhile, the moisture barrier film has elongation sufficient (high enough) to survive the great force and impact of the club face striking the golf ball without fracturing or separating from adjacent layers. Such elongation may be measured at 20° C. and 65% relative humidity using the American Standard Testing Measurement ("ASTM") D882.

Thus, in golf balls of the invention, the moisture barrier film may have an elongation at break of at least 10% or more, or at least 20%, or at least 30%, or at least 40%, or at least 50%, or at least 60%, or at least 75%, or at least 100%. On the one hand, the moisture barrier film may be too hard and brittle where elongation is too low. On the other hand, the moisture barrier film may be too soft and pliable if the elongation is too high, which can create durability problems between the moisture barrier film and adjacent inner and surrounding layers.

As set forth in TABLE I below, several inventive golf ball films Ex. 1A, Ex. 1B, Ex. 2A, and Ex. 2B were made and compared with comparative golf balls Comp. Ex. 1A, Comp. Ex. 1B, Comp. Ex. 2A and Comp. Ex. 2B in order to test and demonstrate the desirability of the MVTR of the inventive films at thicknesses of up to 0.009 inches.

TABLE I

| EXAMPLE | FILM MATERIAL | FILM THICKNESS (inches) | (MVTR) g/(m² · day) |
|---|---|---|---|
| Ex. 1A | Ethylene-based COC | 0.005 | 0.730 |
| Ex. 1B | Ethylene-based COC | 0.005 | 0.742 |
| Ex. 2A | Ethylene-based COC blend* | 0.005 | 1.21 |
| Ex. 2B | Ethylene-based COC blend* | 0.005 | 1.23 |

TABLE I-continued

| EXAMPLE | FILM MATERIAL | FILM THICKNESS (inches) | (MVTR) g/(m² · day) |
|---|---|---|---|
| COMP. Ex. 1A | Surlyn ®Ionomer | 0.005 | 5.71 |
| COMP. Ex. 1B | Surlyn ®Ionomer | 0.005 | 5.89 |
| COMP. Ex. 2A | Surlyn ®Ionomer | 0.010 | 2.69 |
| COMP. Ex. 2B | Surlyn ®Ionomer | 0.010 | 2.82 |

*Blend includes a thermoset or thermoplastic polymer (e.g. maleic anhydride grafted polyolefin) in an amount no greater than 35 wt % by weight based on the total weight of the blend.

Notably, inventive moisture barrier films Ex. 1A, Ex. 1B, Ex. 2A, and Ex. 2B possessed excellent moisture vapor transmission rates of 0.730 g/(m²·day), 0.742 g/(m²·day), 1.21 g/(m²·day), and 1.23 g/(m²·day), respectively, at a resulting film thickness of 0.005 inches. In contrast, comparative ionomer films COMP. Ex. 1A and COMP. Ex. 1B had undesirably considerably higher moisture vapor transmission rates than inventive films Ex. 1A, Ex. 1B, Ex. 2A, and Ex. 2B at a thickness of 0.005 inches, and almost double that of thicker ionomer films (0.010 inches) COMP. Ex. 2A and COMP. Ex. 2B.

In golf balls of the invention, the moisture barrier film displays superior moisture barrier properties at desirable film thicknesses of not greater than 0.009 inches so that inner layers can be protected from moisture penetration without changing targeted playing characteristics. And meanwhile, the ethylene-based cycloolefin copolymer-containing moisture barrier film layer possesses excellent adhesion and sufficient elongation to provide a durable golf ball.

When thermoforming the film, a subassembly and first and second film sheets having identical thicknesses are provided. The first and second film sheets are heated sufficient to soften and drape each film sheet onto and about first and second molds that have the same size, shape and outer surface contour as an outer surface of the subassembly, wherein the first and second molds are comprised of material that will not adhere to the first and second film sheets during draping. Each film sheet is cooled on the first and second molds, forming first and second heat-induced pre-form film half shells having first and second inner surfaces that are sized, shaped and contoured to receive and conformally and adhesively mate with an outer surface of the subassembly. The first and second heat-induced film pre-form half shells may then be removed from the first and second molds and thermoformed onto and about the outer surface of the subassembly and forming an inventive moisture barrier monolayer, bi-layer or multi-layer film about the outer surface, wherein the resulting moisture barrier film has a continuous and substantially uniform thickness of less than 0.009 or as otherwise disclosed herein, and is conformally and adhesively mated with the outer surface such that the moisture barrier film layer has an nMVTR of less than about 5.0 g/(m²·day). At least one outer layer may be formed about the moisture barrier film layer that is comprised of a polymeric material having an MVTR that is greater than the nMVTR of the moisture barrier film layer. In a particular embodiment, a vacuum may be applied or otherwise created during the step of heating the first and second film sheets sufficient to soften and drape each film sheet onto and about the first and second molds.

As used herein, the phrase "first and second heat-induced pre-form film half shells" refers very thin half shell-shaped films having the specified thickness and are produced by exposing very thin first and second sheets of film material to heat sufficient to soften and drape same about a mold outer surface having the same size and shape as an outer surface of the subassembly. The mold consists of a composition that will not adhere to the first and second sheets of film material during softening and draping. Using heat-induced vacuum molding permits the sheets of film to drape onto and about the mold and produce first and second heat-induced pre-form film half shells having inner surfaces that are sized and shaped to be conformal with the outer surface of the subassembly and continuously adhesively mate therewith. Interactions between the first and second inner surfaces and the outer surface of the subassembly at an interface there between produces strong adhesion and first and second heat-induced pre-form film half shells provide uniform and continuous protection to the subassembly against moisture penetration. In a specific embodiment, a vacuum may be applied during softening and draping of the first and second film sheets onto and about first and second molds in order to produce the inner surfaces of the film sheets having the same size, shape and outer surface contour as the outer surface of the subassembly.

As used herein, the term "thermoformed thickness" therefore refers to the thickness of the moisture barrier film layer resulting from such heat effectuated vacuum molding of film sheets, followed by heat-induced compression molding of the first and second heat-induced pre-form film half shells about the outer surface of the subassembly. Advantageously, in a finished golf ball of the invention, the resulting moisture barrier film layer can be at least 50% thinner than the thickness of the film sheets being provided and softened and draped onto and about the mold. This desirably creates a resulting very thin moisture barrier film layer which protects the inner layers from moisture penetration without meanwhile changing performance characteristics and/or presenting durability issues. This is due at least in part to the continuous and uniform thickness of the very thin moisture barrier film layer that is conformal about the adjacent inner layer and free from the pin holes found in prior moisture barrier layers.

Accordingly, each draped film sheet, once cooled on its mold, may then be removed therefrom as first and second heat-induced pre-form film half shells and heat-induced compression molded onto and about the outer surface of the subassembly as a moisture barrier film layer having a continuous and substantially uniform thickness of less than 0.009 inches, and being conformally and adhesively mated onto and about the outer surface. At least one outer layer, having an nMVTR that is greater than the nMVTR of the moisture barrier film layer, may surround the moisture barrier film layer.

The thermoformed quality of the film layer, in combination with the unique construction of the first and second heat-induced pre-form film half shells, prevents gaps from forming between the film layer and an outer surface of the subassembly which it protects, thereby minimizing adhesion problems and producing a uniform and continuous (without pin holes), yet very thin film layer that meanwhile does not negatively change or otherwise interfere with or impact/alter targeted golf ball characteristics. It is envisioned that the heat-induced pre-form film half shells and such outer layer such as a cover may be molded simultaneously or in separate molding steps.

The heat-induced pre-form film half shells may be assembled about the subassembly by hand or machine, and together can then be subjected to heat-induced compression molding. A compression molding mold typically has a mold cavity formed in a pair of hemispherical molds, into which the heat-induced pre-form film half shells assembled about the subassembly may be placed. A combination of heat and pressure is then applied, and results in the heat-induced pre-form film half shells being fused to the outer surface of the subassembly as a unitary one-piece very thin moisture barrier layer about the subassembly. Then a cover layer may be formed about the very thin moisture barrier layer in a separate step using one of several possible methods for forming cover layers, depending on the cover material being used—such as injection molding, discussed in more detail further below.

Embodiments are also envisioned wherein the pair of hemispherical molds have an array of protrusions machined or otherwise provided in its cavity for forming a dimple pattern on the periphery of the golf ball during the cover molding operation, and a pair of hemispherical cover blanks can be placed in a diametrically opposed position on the assembly of the heat-induced pre-form film half shells and subassembly and together be placed in the hemispherical molds, and subjected to the heat-induced compression molding operation. In such an embodiment, the pair of hemispherical cover blanks fuse to the outer surface of very thin moisture barrier layer to form a unitary one-piece cover structure which encapsulates a one-piece very thin moisture barrier layer that has also formed.

A heat-induced pre-form film half shell may be made using as single-ply or multi-ply (co-extruded) film sheet. A multi-ply film sheet may contain two or more very, very thin differing layers of material. Advantageously, each of the very, very thin differing layers of material can serve/contribute a primary benefit in the resulting very thin moisture barrier film layer with respect to adjacent layers. For example, a multilayered film sheet may include a first layer that creates excellent adhesion between the resulting very thin film moisture barrier layer and the subassembly, while an intermediate layer of the multi-layered film sheet may provide excellent protection against moisture penetration into the subassembly, with an third layer of the multi-layer film sheet creating great adhesion between the resulting multi-layer film and a surrounding outer layer such as a cover. In such a case, all three layers of the multi-layer film sheet, combined, may together impart excellent moisture barrier properties to protect the core/subassembly against moisture penetration as well as adhesion when incorporated into the golf ball as thermoformed, heat-induced pre-formed very thin film half shells.

Regardless of the particular film sheet selected (i.e., whether single material or multi-ply), it is the unique construction of the thermoformed, heat-induced pre-formed very thin film half shells—which addresses and overcomes the disadvantages of prior golf balls incorporating thin moisture barrier film layers by advantageously creating a continuous and substantially uniform very thin film moisture barrier film layer that is conformally and adhesively mated onto and about the outer surface of the core/subassembly and durably protects the subassembly to a great extent When compression molding the film, a half-shell of the film material is first formed via injection molding and then a core (or other subassembly) comprising one or more layers is enclosed within the two half shells and then placed into a compression mold cavity and compressed at a mold temperature of from for example 150° F. to 400° F., or from 250° F. to 350° F., or from 260° F. to 295° F.

The film may be applied via vacuum molding, wherein first and second moisture barrier films may be suction formed to the cavities of first and second mold halves using a vacuum source so that uniformity in layer thickness can be maintained. Then the core or other subassembly may be inserted into the mold halves between the first and second films and the half shells/films are compression molded about the subassembly under suitable temperature such as discussed above and suitable pressure as well known in the art.

The cycloolefin copolymers can be prepared in a known manner at temperatures of from −78 to 200° C. and at a pressure of from 0.01 to 200 bar, in the presence of one or more catalyst systems in which at least one transition metal compound and, if appropriate, a cocatalyst and a support material are present. Suitable transition metal compounds are metallocenes, in particular stereorigid metallocenes. Examples of catalyst systems suitable for preparation of the COCs are described by way of example in U.S. Pat. No. 5,008,356, EP-A-0 407 870, EP-A-0 485 893 and EP-A-0 503 422.

Other routes briefly outlined below can also be used to prepare the cycloolefin copolymers: catalyst systems based on mixed catalysts composed of titanium salts and of organylaluminum compounds are described in DD-A-109 224 and DD-A-237 070. EP-A-0 156 464 describes preparation using vanadium-based catalysts. The cycloolefin copolymers can also be obtained via ring-opening polymerization of at least one of the monomers having the formulas I to VI and subsequent hydrogenation of the products obtained. The polymerization can also take place in a plurality of stages, and block copolymers can also be produced. See, for example, DE-A-42 05 416.

The heat resistance of the cycloolefin copolymers can be adjusted widely, with glass transition temperatures of the cycloolefin copolymers in a range of from 25 to 200.degree. C., In this regard, mixtures of cycloolefin copolymers having various glass transition temperatures can be used.

The density of the cycloolefin copolymers are typically in the range of from 0.9 to 1.1 g/cm$^3$, preferably from 0.9 to 1.05 g/cm$^3$.

Polymer blends can be prepared via melt-compounding or via mixing in solution. However, unless otherwise specified, the polymer blends can generally be prepared by any suitable methods known in the art. For example, the blends may be prepared by "salt and pepper" techniques via simple mixing of granules. However, it has been discovered that finer mixing of the phases of immiscible blends is achieved if the individual components are melted and mixed. This type of blend is called a melt-compounded material. Twin-screw extruders are typically used for the compounding process, but kneaders can also be used.

The polyethylene portion of the cyclolefin copolymer can preferably be added directly within the production plant during the process of preparing the COC (internal melt-compounding). Here, the polyethylene is added to the cycloolefin melt which remains after reaction solvent has been drawn off. By way of example, the polyethylene may be added via a subsidiary extruder or a co-kneader, in which the polyethylene is melted. A melt pump can be used to meter the material into the cycloolefin copolymer melt stream. Mixing elements such as static mixers can be used for mixing of the melts. The polymer blends are then subsequently granulated by conventional means, e.g. via strand pelletization, underwater ring pelletization, die-face pelletization or droplet pelletization.

Alternatively, polymer blends can be prepared via dissolution of the individual blend components in solvent, mixing of the solutions and removal of the solvent. Removal of the solvent here can be achieved via solvent evaporation, for example at an elevated temperature and/or reduced pressure. As an alternative, the solvent can be removed via introduction of the blend solution into a precipitant and filtration of the precipitated polymer blend. The precipitated material can then be subjected to a pelletizing step or used directly as powder.

In another, embodiment, the polethylene solution can be added during the cycloolefin copolymer preparation process—and this means that the mixing in solution takes place directly in the production plant (internal mixing in solution). The polyethylene solution can be added directly into the polymerization reactor, but preferably after conclusion of the copolymerization reaction, prior to removal of the solvent.

To this end, the polyethylene can be dissolved in a stirred tank under suitable conditions and added by way of a pump to the cycloolefin copolymer solution. The mixing of the two solutions can take place in a stirred vessel or in pipelines through which material flows. The solvent is then removed via solvent evaporation, for example at an elevated temperature and/or reduced pressure. The melt is then cast to give a strand and pelletized conventionally, e.g. via strand pelletization, underwater ring pelletization, die-face pelletization or droplet pelletization.

Examples of suitable solvents for preparation of the polyethylene solution are high-boiling aliphatics, but other solvents can also be used. The polyethylene solution can be prepared at from 50 to 200.degree. C., preferably from 90 to 200.degree. C. The concentration of the polyethylene solution is from 1 to 25%, preferably from 5 to 25%, particularly preferably from 10 to 20%. The purity of the solutions can be increased via use of suitable filters.

Irrespective of whether the blend has been prepared in the inventive process in solution or in the melt, the purity of the melt can be increased via melt filtration, e.g. by way of depth filters. The film layers can be combined to give composite bi-layer or multi-layer films. The composite can be produced via lamination of films each of which have been previously produced individually, or can be produced via co-extrusion or via extrusion coating or extrusion lamination.

There can also be further adhesion-improving layers provided between the individual layers. The adhesion-improving layer can advantageously be applied in the melt or else as solution, suspension or solvent-containing adhesive.

A film can be produced by compressing the polymer blend wherein the polymer blend is compressed and heated in an extruder, then the melt is extruded through a flat-film die or annular die and, if appropriate, quenched on a chill roll, and the resultant film is drawn off on one or more rolls or rollers.

Bi-layer and multilayer films can be formed via coextrusion, extrusion coating or extrusion lamination.

However, the films as claimed in the invention can be produced via any known process for production of mono-, bi- or multilayer plastics films, where the polymer blends are compressed and heated in an extruder and then the melt or the melts are extruded through a flat-film die and the resultant film is drawn off on one or more rolls.

If appropriate, the additives can be added previously to the polymer or polymer blend, or can be added via masterbatch technology.

The melt(s) can also be extruded via an annular die, whereupon the resultant film is processed in a blown-film plant to give the film and is collapsed by way of rolls.

The specified temperatures in the barrel and dies can be reduced from 230° C. to 210° C., producing less thermal stress during production of extruded films. This method also permits a reduction in the defect numbers of the films.

One or both surface(s) of the film can, if appropriate, be corona- or otherwise treated by known methods.

However, the inventive polymer blends can also be used for production of moldings by means of extrusion blow molding processes or injection blow molding processes. In the extrusion blow molding process, a blowable preform is produced via extrusion in a first stage. In a second stage, blow molding takes place, with subsequent cooling of the molding. In contrast to the extrusion blow molding process, the injection blow molding process injection-molds a preform. The second stage in turn encompasses the blow molding and cooling of the molding in the blow mold.

It is understood that the moisture barrier film may be used in connection with any known golf ball construction to protect moisture from penetrating into inner layers having a greater nMVTR than that of the moisture barrier film. Meanwhile, the moisture barrier film is particularly useful where its nMVTR is lower or less than that of any surrounding golf ball layer. In a golf ball of the invention, the subassembly and/or outer layer surrounding the very thin moisture barrier film may be formed from conventional thermoset and/or thermoplastic materials, with the one limitation being that the very thin moisture barrier film generally should be adjacent to at least one layer containing a material that is vulnerable to moisture penetration.

Golf balls of the invention can be of any size, although the USGA requires that golf balls used in competition have a diameter of at least 1.68 inches. For play outside of United States Golf Association (USGA) rules, the golf balls can be of a smaller size. Normally, golf balls are manufactured in accordance with USGA requirements and have a diameter in the range of about 1.68 to about 1.80 inches. Also, the USGA has established a maximum weight of 45.93 g (1.62 ounces) for golf balls. For play outside of USGA rules, the golf balls can be heavier. Thus, the diameter of the golf balls may be, for example, from about 1.680 inches to about 1.800 inches, or from about 1.680 inches to about 1.760 inches, or from about 1.680 inches (43 mm) to about 1.740 inches (44 mm), or even anywhere in the range of from 1.700 to about 1.950 inches.

The diameter and thickness of the different layers (other than the moisture barrier film), along with properties such as hardness and compression, may vary depending upon the desired playing performance properties of the golf ball such as spin, initial velocity, and feel. The term, "layer", as used herein, means generally any spherical portion of the golf ball and includes the very thin moisture barrier film, although the very thin moisture barrier film should not negatively impact or otherwise alter golf ball playing characteristics.

Accordingly, the dimensions of each golf ball component such as the diameter of the core and respective thicknesses of the intermediate layer (s), cover layer(s) and/or coating layer(s) may be selected and coordinated as known in the art for targeting and achieving such desired playing characteristics or feel. Ideally, a golf ball of the invention is at least a three-piece golf ball, including the very thin moisture barrier film. However, embodiments are indeed envisioned wherein a golf ball of the invention may have two layers including the very thin moisture barrier film, with the limitation being that in such an embodiment, the surface properties of the very thin moisture barrier film should be such that the golf ball could withstand the great force of a club striking that surface without cracking or otherwise breaking or becoming vulnerable to moisture penetration.

In one embodiment, the golf ball may comprise a single core and a single cover layer or coating layer, wherein the very thin moisture barrier film is disposed about the core and is surrounded by the cover or coating layer.

In another version, a golf ball of the invention may incorporate a dual-layered core, a single-layered cover, and at least one very thin moisture barrier film. The dual-core includes an inner core (center) and surrounding outer core layer. In this embodiment, a very thin moisture barrier film may be disposed between the inner core and the outer core layer, or between the outer core layer and single-cover layer, or both, depending on whether the materials selected for the inner core and/or outer core layer are typically vulnerable to moisture penetration.

In another version, the golf ball may contain a single core layer and two cover layers, with at least one very thin moisture barrier film disposed as needed to prevent moisture from penetrating a particular inner layer of the golf ball—i.e., between the single core layer and innermost cover layer, or between the inner cover layer and outer cover layer, or both. In yet another version, a golf ball may contain a dual-core and dual-cover (inner cover layer and outer cover layer), and at least one very thin moisture barrier film may be disposed as needed to prevent moisture from penetrating a particular inner layer of the golf ball—between the inner core layer and outer core layer, between the outer core layer and inner cover layer, between the inner cover layer and outer cover layer, or combinations thereof.

In still another embodiment, a golf ball of the invention may contain a dual-core; an inner cover layer, an intermediate cover layer, and an outer cover layer, with at least one very thin moisture barrier film disposed as needed between two given of these layer to prevent moisture from penetrating into the inner layer of the two given layers. Or, a golf ball may contain a three-layered core with an innermost core layer (or center), an intermediate core layer, and outer core layer, and a two-layered cover with an inner and outer cover layer, and at least one very thin moisture barrier film disposed as needed between two given layers of the construction in order to prevent moisture from penetrating a particular inner layer of the golf ball.

That being said, a core layer in a golf ball of the invention may for example be solid, semi-solid, fluid-filled, or hollow, and may have a single-piece or multi-piece structure. The overall diameter of the core and all intermediate layers is often about 80 percent to about 98 percent of the overall diameter of the finished ball. A variety of materials may be used to make the core including thermoset compositions such as rubber, styrene butadiene, polybutadiene, isoprene, polyisoprene, trans-isoprene; thermoplastics such as ionomer resins, polyamides or polyesters; and thermoplastic and thermoset polyurethane and polyurea elastomers. In one embodiment, the core is a single-piece made from a natural or synthetic rubber composition such as polybutadiene. In other instances, a two-piece core is constructed; that is, there may be two core layers. For example, an inner core portion may be made of a first base rubber material and an outer core layer, which surrounds the inner core, may be made of a second base rubber material. The respective core pieces may be made of the same or different rubber materials. Cross-linking agents and fillers may be added to the rubber materials.

More particularly, materials for solid cores typically include compositions having a base rubber, a filler, an initiator agent, and a cross-linking agent. The base rubber typically includes natural or synthetic rubber, such as polybutadiene rubber. In one embodiment, the base rubber is 1,4-polybutadiene having a cis-structure of at least 40%. The polybutadiene can be blended with other elastomers such as natural rubber, polyisoprene rubber, styrene-butadiene rubber and/or other polybutadienes. Another suitable rubber that may be used in the core is trans-polybutadiene. This polybutadiene isomer is formed by converting the cis-isomer of the polybutadiene to the trans-isomer during a molding cycle. A soft and fast agent such as pentachlorothiophenol (PCTP) or ZnPCTP can be blended with the polybutadiene. These compounds may also function as cis-to-trans catalyst to convert some cis-1,4 bonds in the polybutadiene into trans 1,4 bonds.

Fillers, which may be used to modify such properties as the specific gravity (density-modifying materials), hardness, weight, modulus, resiliency, compression, and the like may be added to the core composition. Normally, the fillers are inorganic, and suitable fillers include numerous metals or metal oxides, such as zinc oxide and tin oxide, as well as barium sulfate, zinc sulfate, calcium carbonate, barium carbonate, clay, tungsten, tungsten carbide, silica, and mixtures thereof. Fillers may also include various foaming agents or blowing agents, zinc carbonate, regrind (recycled core material typically ground to about 30 mesh or less particle size), high-Mooney-viscosity rubber regrind, and the like. In addition, polymeric, ceramic, metal, and glass microspheres may be used.

Again, the hardness of the core may vary depending upon the desired properties of the ball.

In one embodiment, at least one of the core layers is formed of a rubber composition comprising polybutadiene rubber material. More particularly, in one version, the ball contains a single inner core formed of the polybutadiene rubber composition. In a second version, the ball contains a dual-core comprising an inner core (center) and surrounding outer core layer.

In one version, the core is formed of a rubber composition comprising a rubber material such as, for example, polybutadiene, ethylene-propylene rubber, ethylene-propylene-diene rubber, polyisoprene, styrene-butadiene rubber, polyalkenamers, butyl rubber, halobutyl rubber, or polystyrene elastomers. For example, polybutadiene rubber compositions may be used to form the inner core (center) and surrounding outer core layer in a dual-layer construction. In another version, the core may be formed from an ionomer composition comprising an ethylene acid copolymer containing acid groups such that greater than 70% of the acid groups are neutralized. These highly neutralized polymers (HNPs) also may be used to form at least one core layer in a multi-layered core construction. For example, a polybutadiene rubber composition may be used to form the center and a HNP composition may be used to form the outer core. Such rubber and HNP compositions are discussed in further detail below.

In general, polybutadiene is a homopolymer of 1,3-butadiene. The double bonds in the 1,3-butadiene monomer are attacked by catalysts to grow the polymer chain and form a polybutadiene polymer having a desired molecular weight. Any suitable catalyst may be used to synthesize the polybutadiene rubber depending upon the desired properties. Normally, a transition metal complex (for example, neodymium, nickel, or cobalt) or an alkyl metal such as alkyl-lithium is used as a catalyst. Other catalysts include, but are not limited to, aluminum, boron, lithium, titanium, and combinations thereof. The catalysts produce polybutadiene rubbers having different chemical structures. In a cis-bond configuration, the main internal polymer chain of the polybutadiene appears on the same side of the carbon-carbon double bond contained in the polybutadiene. In a trans-bond configuration, the main internal polymer chain is on opposite sides of the internal carbon-carbon double bond in the polybutadiene. The polybutadiene rubber can have various combinations of cis- and trans-bond structures. A preferred polybutadiene rubber has a 1,4 cis-bond content of at least 40%, preferably greater than 80%, and more preferably greater than 90%. In general, polybutadiene rubbers having a high 1,4 cis-bond content have high tensile strength. The polybutadiene rubber may have a relatively high or low Mooney viscosity.

Examples of commercially-available polybutadiene rubbers that can be used in accordance with this invention, include, but are not limited to, BR 01 and BR 1220, available from BST Elastomers of Bangkok, Thailand; SE BR 1220LA and SE BR1203, available from DOW Chemical Co of Midland, Mich.; BUDENE 1207, 1207s, 1208, and 1280 available from Goodyear, Inc of Akron, Ohio; BR 01, 51 and 730, available from Japan Synthetic Rubber (JSR) of Tokyo, Japan; BUNA CB 21, CB 22, CB 23, CB 24, CB 25, CB 29 MES, CB 60, CB Nd 60, CB 55 NF, CB 70 B, CB KA 8967, and CB 1221, available from Lanxess Corp. of Pittsburgh. Pa.; BR1208, available from LG Chemical of Seoul, South Korea; UBEPOL BR130B, BR150, BR150B, BR150L, BR230, BR360L, BR710, and VCR617, available from UBE Industries, Ltd. of Tokyo, Japan; EUROPRENE NEOCIS BR 60, INTENE 60 AF and P30AF, and EUROPRENE BR HV80, available from Polimeri Europa of Rome, Italy; AFDENE 50 and NEODENE BR40, BR45, BR50 and BR60, available from Karbochem (PTY) Ltd. of Bruma, South Africa; KBR 01, NdBr 40, NdBR-45, NdBr 60, KBR 710S, KBR 710H, and KBR 750, available from Kumho Petrochemical Co., Ltd. Of Seoul, South Korea; and DIENE 55NF, 70AC, and 320 AC, available from Firestone Polymers of Akron, Ohio.

To form the core, the polybutadiene rubber is used in an amount of at least about 5% by weight based on total weight of composition and is generally present in an amount of about 5% to about 100%, or an amount within a range having a lower limit of 5% or 10% or 20% or 30% or 40% or 50% and an upper limit of 55% or 60% or 70% or 80% or 90% or 95% or 100%. In general, the concentration of polybutadiene rubber is about 45 to about 95 weight percent. Preferably, the rubber material used to form the core layer comprises at least 50% by weight, and more preferably at least 70% by weight, polybutadiene rubber.

The rubber compositions of this invention may be cured, either by pre-blending or post-blending, using conventional curing processes. Suitable curing processes include, for example, peroxide-curing, sulfur-curing, high-energy radiation, and combinations thereof. Preferably, the rubber composition contains a free-radical initiator selected from organic peroxides, high energy radiation sources capable of generating free-radicals, and combinations thereof. In one preferred version, the rubber composition is peroxide-cured. Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel. Peroxide free-radical initiators are generally present in the rubber composition in an amount of at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubbers, and an upper limit of 2.5 parts or 3 parts or 5 parts or 6 parts or 10 parts or 15 parts by weight per 100 parts of the total rubber. Concentrations are in parts per hundred (phr) unless otherwise indicated. As used herein, the term, "parts per hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100.

The rubber compositions preferably include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particular examples of suitable metal salts include, but are not limited to, one or more metal salts of acrylates, diacrylates, methacrylates, and dimethacrylates, wherein the metal is selected from magnesium, calcium, zinc, aluminum, lithium, and nickel. In a particular embodiment, the co-agent is selected from zinc salts of acrylates, diacrylates, methacrylates, and dimethacrylates. In another particular embodiment, the agent is zinc diacrylate (ZDA). When the co-agent is zinc diacrylate and/or zinc dimethacrylate, the co-agent is typically included in the rubber composition in an amount within the range having a lower limit of 1 or 5 or 10 or 15 or 19 or 20 parts by weight per 100 parts of the total rubber, and an upper limit of 24 or 25 or 30 or 35 or 40 or 45 or 50 or 60 parts by weight per 100 parts of the base rubber.

Radical scavengers such as a halogenated organosulfur or metal salt thereof, organic disulfide, or inorganic disulfide compounds may be added to the rubber composition. These compounds also may function as "soft and fast agents." As used herein, "soft and fast agent" means any compound or a blend thereof that is capable of making a core: 1) softer (having a lower compression) at a constant "coefficient of restitution" (COR); and/or 2) faster (having a higher COR at equal compression), when compared to a core equivalently prepared without a soft and fast agent. Preferred halogenated organosulfur compounds include, but are not limited to, pentachlorothiophenol (PCTP) and salts of PCTP such as zinc pentachlorothiophenol (ZnPCTP). Using PCTP and ZnPCTP in golf ball inner cores helps produce softer and faster inner cores. The PCTP and ZnPCTP compounds help increase the resiliency and the coefficient of restitution of the core. In a particular embodiment, the soft and fast agent is selected from ZnPCTP, PCTP, ditolyl disulfide, diphenyl disulfide, dixylyl disulfide, 2-nitroresorcinol, and combinations thereof.

The rubber compositions of the present invention also may include "fillers," which are added to adjust the density and/or specific gravity of the material. Suitable fillers include, but are not limited to, polymeric or mineral fillers, metal fillers, metal alloy fillers, metal oxide fillers and carbonaceous fillers. The fillers can be in any suitable form including, but not limited to, flakes, fibers, whiskers, fibrils, plates, particles, and powders. Rubber regrind, which is ground, recycled rubber material (for example, ground to about 30 mesh particle size) obtained from discarded rubber golf ball cores, also can be used as a filler. The amount and type of fillers utilized are governed by the amount and weight of other ingredients in the golf ball, since a maximum golf ball weight of 45.93 g (1.62 ounces) has been established by the United States Golf Association (USGA).

Suitable polymeric or mineral fillers that may be added to the rubber composition include, for example, precipitated hydrated silica, clay, talc, asbestos, glass fibers, aramid fibers, mica, calcium metasilicate, barium sulfate, zinc sulfide, lithopone, silicates, silicon carbide, tungsten carbide, diatomaceous earth, polyvinyl chloride, carbonates such as calcium carbonate and magnesium carbonate. Suitable metal fillers include titanium, tungsten, aluminum, bismuth, nickel, molybdenum, iron, lead, copper, boron, cobalt, beryllium, zinc, and tin. Suitable metal alloys include steel, brass, bronze, boron carbide whiskers, and tungsten carbide whiskers. Suitable metal oxide fillers include zinc oxide, iron oxide, aluminum oxide, titanium oxide, magnesium oxide, and zirconium oxide. Suitable particulate carbonaceous fillers include graphite, carbon black, cotton flock, natural bitumen, cellulose flock, and leather fiber. Micro balloon fillers such as glass and ceramic, and fly ash fillers can also be used. In a particular aspect of this embodiment, the rubber composition includes filler(s) selected from carbon black, nanoclays (e.g., Cloisite® and Nanofil® nanoclays, commercially available from Southern Clay Products, Inc., and Nanomax® and Nanomer® nanoclays, commercially available from Nanocor, Inc.), talc (e.g., Luzenac HAR® high aspect ratio talcs, commercially available from Luzenac America, Inc.), glass (e.g., glass flake, milled glass, and microglass), mica and mica-based pigments (e.g., Iriodin® pearl luster pigments, commercially available from The Merck Group), and combinations thereof. In a particular embodiment, the rubber composition is modified with organic fiber micropulp.

In addition, the rubber compositions may include antioxidants to prevent the breakdown of the elastomers. Also, processing aids such as high molecular weight organic acids and salts thereof, may be added to the composition. In a particular embodiment, the total amount of additive(s) and filler(s) present in the rubber composition is 15 wt % or less, or 12 wt % or less, or 10 wt % or less, or 9 wt % or less, or 6 wt % or less, or 5 wt % or less, or 4 wt % or less, or 3 wt % or less, based on the total weight of the rubber composition.

The polybutadiene rubber material (base rubber) may be blended with other elastomers in accordance with this invention. Other elastomers include, but are not limited to, polybutadiene, polyisoprene, ethylene propylene rubber ("EPR"), styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof.

The polymers, free-radical initiators, filler, cross-linking agents, and any other materials used in forming either the golf ball center or any of the core, in accordance with invention, may be combined to form a mixture by any type of mixing known to one of ordinary skill in the art. Suitable types of mixing include single pass and multi-pass mixing, and the like. The cross-linking agent, and any other optional additives used to modify the characteristics of the golf ball center or additional layer(s), may similarly be combined by any type of mixing. A single-pass mixing process where ingredients are added sequentially is preferred, as this type of mixing tends to increase efficiency and reduce costs for the process. The preferred mixing cycle is single step wherein the polymer, cis-to-trans catalyst, filler, zinc diacrylate, and peroxide are added in sequence.

In one preferred embodiment, the entire core or at least one core layer in a multi-layered structure is formed of a rubber composition comprising a material selected from the group of natural and synthetic rubbers including, but not limited to, polybutadiene, polyisoprene, ethylene propylene rubber ("EPR"), ethylene-propylene-diene ("EPDM") rubber, styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof.

As discussed above, single and multi-layered cores can be made in accordance with this invention. In two-layered cores, a thermoset material such as, for example, thermoset rubber, can be used to make the outer core layer or a thermoplastic material such as, for example, ethylene acid copolymer containing acid groups that are at least partially or fully neutralized can be used to make the outer core layer. Suitable ionomer compositions include partially-neutralized ionomers and highly-neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers. Suitable ethylene acid copolymer ionomers and other thermoplastics that can be used to form the core layer(s) are the same materials that can be used to make an inner cover layer as discussed further below.

In another example, multi-layered cores having an inner core, intermediate core layer, and outer core layer, wherein the intermediate core layer is disposed between the intermediate and outer core layers may be prepared in accordance with this invention. More particularly, as discussed above, the inner core may be constructed from a thermoplastic or thermoset composition, such as thermoset rubber. Meanwhile, the intermediate and outer core layers also may be formed from thermoset or thermoplastic materials. Suitable thermoset and thermoplastic compositions that may be used to form the intermediate/outer core layers are discussed above. For example, each of the intermediate and outer core layers may be formed from a thermoset rubber composition. Thus, the intermediate core layer may be formed from a first thermoset rubber composition; and the outer core layer may be formed from a second thermoset rubber composition. In another embodiment, the intermediate core layer is formed from a thermoset composition; and the outer core layer is formed from a thermoplastic composition. In a third embodiment, the intermediate core layer is formed from a thermoplastic composition; and the outer core layer is formed from a thermoset composition. Finally, in a fourth embodiment, the intermediate core layer is formed from a first thermoplastic composition; and the outer core layer is formed from a second thermoplastic compositions.

The core may for example have a diameter ranging from about 0.09 inches to about 1.65 inches. In one embodiment, the diameter of the core of the present invention is about 1.2 inches to about 1.630 inches. For example, when part of a two-piece ball according to invention, the core may have a diameter ranging from about 1.5 inches to about 1.62 inches. In another embodiment, the diameter of the core is about 1.3 inches to about 1.6 inches, preferably from about 1.39 inches to about 1.6 inches, and more preferably from about 1.5 inches to about 1.6 inches. In yet another embodiment, the core has a diameter of about 1.55 inches to about 1.65 inches, preferably about 1.55 inches to about 1.60 inches.

In some embodiments, the core may have an overall diameter within a range having a lower limit of 0.500 or 0.700 or 0.750 or 0.800 or 0.850 or 0.900 or 0.950 or 1.000 or 1.100 or 1.150 or 1.200 or 1.250 or 1.300 or 1.350 or 1.400 or 1.450 or 1.500 or 1.600 or 1.610 inches and an upper limit of 1.620 or 1.630 or 1.640 inches. In a particular embodiment, the core is a multi-layer core having an overall diameter within a range having a lower limit of 0.500 or 0.700 or 0.750 or 0.800 or 0.850 or 0.900 or 0.950 or 1.000 or 1.100 or 1.150 or 1.200 inches and an upper limit of 1.250 or 1.300 or 1.350 or 1.400 or 1.450 or 1.500 or 1.600 or 1.610 or 1.620 or 1.630 or 1.640 inches. In another particular embodiment, the multi-layer core has an overall diameter within a range having a lower limit of 0.500 or 0.700 or 0.750 inches and an upper limit of 0.800 or 0.850 or 0.900 or 0.950 or 1.000 or 1.100 or 1.150 or 1.200 or 1.250 or 1.300 or 1.350 or 1.400 or 1.450 or 1.500 or 1.600 or 1.610 or 1.620 or 1.630 or 1.640 inches. In another particular embodiment, the multi-layer core has an overall diameter of 1.500 inches or 1.510 inches or 1.530 inches or 1.550 inches or 1.570 inches or 1.580 inches or 1.590 inches or 1.600 inches or 1.610 inches or 1.620 inches.

In some embodiments, the inner core can have an overall diameter of 0.500 inches or greater, or 0.700 inches or greater, or 1.00 inches or greater, or 1.250 inches or greater, or 1.350 inches or greater, or 1.390 inches or greater, or 1.450 inches or greater, or an overall diameter within a range having a lower limit of 0.250 or 0.500 or 0.750 or 1.000 or 1.250 or 1.350 or 1.390 or 1.400 or 1.440 inches and an upper limit of 1.460 or 1.490 or 1.500 or 1.550 or 1.580 or 1.600 inches, or an overall diameter within a range having a lower limit of 0.250 or 0.300 or 0.350 or 0.400 or 0.500 or 0.550 or 0.600 or 0.650 or 0.700 inches and an upper limit of 0.750 or 0.800 or 0.900 or 0.950 or 1.000 or 1.100 or 1.150 or 1.200 or 1.250 or 1.300 or 1.350 or 1.400 inches. In one embodiment, the inner core consists of a single layer formed from a thermoset rubber composition. In another embodiment, the inner core consists of two layers, each of which is formed from the same or different thermoset rubber compositions. In another embodiment, the inner core comprises three or more layers, each of which is formed from the same or different thermoset rubber compositions. In another embodiment, the inner core consists of a single layer formed from a thermoplastic composition. In another embodiment, the inner core consists of two layers, each of which is formed from the same or different thermoplastic compositions. In another embodiment, the inner core comprises three or more layers, each of which is formed from the same or different thermoplastic compositions. In some embodiments, the outer core layer can have an overall thickness within a range having a lower limit of 0.010 or 0.020 or 0.025 or 0.030 or 0.035 inches and an upper limit of 0.040 or 0.070 or 0.075 or 0.080 or 0.100 or 0.150 inches, or an overall thickness within a range having a lower limit of 0.025 or 0.050 or 0.100 or 0.150 or 0.160 or 0.170 or 0.200 inches and an upper limit of 0.225 or 0.250 or 0.275 or 0.300 or 0.325 or 0.350 or 0.400 or 0.450 or greater than 0.450 inches. The outer core layer may alternatively have a thickness of greater than 0.10 inches, or 0.20 inches or greater, or greater than 0.20 inches, or 0.30 inches or greater, or greater than 0.30 inches, or 0.35 inches or greater, or greater than 0.35 inches, or 0.40 inches or greater, or greater than 0.40 inches, or 0.45 inches or greater, or greater than 0.45 inches, or a thickness within a range having a lower limit of 0.005 or 0.010 or 0.015 or 0.020 or 0.025 or 0.030 or 0.035 or 0.040 or 0.045 or 0.050 or 0.055 or 0.060 or 0.065 or 0.070 or 0.075 or 0.080 or 0.090 or 0.100 or 0.200 or 0.250 inches and an upper limit of 0.300 or 0.350 or 0.400 or 0.450 or 0.500 inches.

In one embodiment, the outer core consists of a single layer formed from a thermoset rubber composition. In another embodiment, the outer core consists of two layers, each of which is formed from the same or different thermoset rubber compositions. In another embodiment, the outer core comprises three or more layers, each of which is formed from the same or different thermoset rubber compositions. In another embodiment, the outer core consists of a single layer formed from a thermoplastic composition. In another embodiment, the outer core consists of two layers, each of which is formed from the same or different thermoplastic compositions. In another embodiment, the outer core comprises three or more layers, each of which is formed from the same or different thermoplastic compositions.

An intermediate core layer can have an overall thickness within a range having a lower limit of 0.005 or 0.010 or 0.015 or 0.020 or 0.025 or 0.030 or 0.035 or 0.040 or 0.045 inches and an upper limit of 0.050 or 0.055 or 0.060 or 0.065 or 0.070 or 0.075 or 0.080 or 0.090 or 0.100 inches. In one embodiment, the intermediate core consists of a single layer formed from a thermoset rubber composition. In another embodiment, the intermediate core consists of two layers, each of which is formed from the same or different thermoset rubber compositions. In another embodiment, the intermediate core comprises three or more layers, each of which is formed from the same or different thermoset rubber compositions. In another embodiment, the intermediate core consists of a single layer formed from a thermoplastic composition. In another embodiment, the intermediate core consists of two layers, each of which is formed from the same or different thermoplastic compositions. In another embodiment, the intermediate core comprises three or more layers, each of which is formed from the same or different thermoplastic compositions.

The compression of the core is generally overall in the range of about 40 to about 110. In other embodiments, the overall CoR of cores of the present invention at 125 ft/s is at least 0.750, or at least 0.775 or at least 0.780, or at least 0.785, or at least 0.790, or at least 0.795, or at least 0.800. Cores are also known to comprise a variety of other materials that are typically also used for intermediate and cover layers. Intermediate layers may likewise also comprise materials generally used in cores and covers as described herein for example.

An intermediate layer is sometimes thought of as including any layer(s) disposed between the inner core (or center) and the outer cover of a golf ball, and thus in some embodiments, the intermediate layer may include an outer core layer, a casing layer, or inner cover layer(s). In this regard, a golf ball of the invention may include one or more intermediate layers. An intermediate layer may be used, if desired, with a multilayer cover or a multilayer core, or with both a multilayer cover and a multilayer core.

In one non-limiting embodiment, an intermediate layer having a thickness of about 0.010 inches to about 0.06 inches, is disposed about a core having a diameter ranging from about 1.5 inches to about 1.59 inches. In this embodiment, the core may consist of a conventional core material such as a rubber composition. In some embodiments, the intermediate layer may be covered by a conventional castable thermoset or injection moldable thermoplastic material or of any other cover materials discussed herein or as is otherwise known in the art.

Intermediate layer(s) may be formed, at least in part, from one or more homopolymeric or copolymeric materials, such as ionomers, primarily or fully non-ionomeric thermoplastic materials, vinyl resins, polyolefins, polyurethanes, polyureas, polyamides, acrylic resins and blends thereof, olefinic thermoplastic rubbers, block copolymers of styrene and butadiene, isoprene or ethylene-butylene rubber, copoly(ether-amide), polyphenylene oxide resins or blends thereof, and thermoplastic polyesters.

The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the present invention, the intermediate layer, or inner cover layer, may have a thickness about 0.3 inches or less. In one embodiment, the thickness of the intermediate layer is from about 0.002 inches to about 0.1 inches, and preferably about 0.01 inches or greater. For example, when part of a three-piece ball or multi-layer ball according to the invention, the intermediate layer and/or inner cover layer may have a thickness ranging from about 0.010 inches to about 0.06 inches. In another embodiment, the intermediate layer thickness is about 0.05 inches or less, or about 0.01 inches to about 0.045 inches for example.

The cover typically has a thickness to provide sufficient strength, good performance characteristics, and durability. In one embodiment, the cover thickness may for example be from about 0.02 inches to about 0.12 inches, or about 0.1 inches or less. For example, the cover may be part of a two-piece golf ball and have a thickness ranging from about 0.03 inches to about 0.09 inches. In another embodiment, the cover thickness may be about 0.05 inches or less, or from about 0.02 inches to about 0.05 inches, or from about 0.02 inches and about 0.045 inches.

The cover may be a single-, dual-, or multi-layer cover and have an overall thickness for example within a range having a lower limit of 0.010 or 0.020 or 0.025 or 0.030 or 0.040 or 0.045 inches and an upper limit of 0.050 or 0.060 or 0.070 or 0.075 or 0.080 or 0.090 or 0.100 or 0.150 or 0.200 or 0.300 or 0.500 inches. In a particular embodiment, the cover may be a single layer having a thickness of from 0.010 or 0.020 or 0.025 inches to 0.035 or 0.040 or 0.050 inches. In another particular embodiment, the cover may consist of an inner cover layer having a thickness of from 0.010 or 0.020 or 0.025 inches to 0.035 or 0.050 inches and an outer cover layer having a thickness of from 0.010 or 0.020 or 0.025 inches to 0.035 or 0.040 inches.

In one embodiment, the cover may be a single layer having a surface hardness of 60 Shore D or greater, or 65 Shore D or greater. In a particular aspect of this embodiment, the cover is formed from a composition having a material hardness of 60 Shore D or greater, or 65 Shore D or greater.

In another particular embodiment, the cover may be a single layer having a thickness of from 0.010 or 0.020 inches to 0.035 or 0.050 inches and formed from an ionomeric composition having a material hardness of from 60 or 62 or 65 Shore D to 65 or 70 or 72 Shore D.

In yet another particular embodiment, the cover is a single layer having a thickness of from 0.010 or 0.025 inches to 0.035 or 0.040 inches and formed from a thermoplastic composition selected from ionomer-, polyurethane-, and polyurea-based compositions having a material hardness of 62 Shore D or less, or less than 62 Shore D, or 60 Shore D or less, or less than 60 Shore D, or 55 Shore D or less, or less than 55 Shore D.

In still another particular embodiment, the cover is a single layer having a thickness of from 0.010 or 0.025 inches to 0.035 or 0.040 inches and formed from a thermosetting polyurethane- or polyurea-based composition having a material hardness of 62 Shore D or less, or less than 62 Shore D, or 60 Shore D or less, or less than 60 Shore D, or 55 Shore D or less, or less than 55 Shore D.

In an alternative embodiment, the cover may comprise an inner cover layer formed from an ionomeric composition and an outer cover layer formed from a thermosetting polyurethane- or polyurea-based composition. The inner cover layer composition may have a material hardness of from 60 or 62 or 65 Shore D to 65 or 70 or 72 Shore D. The inner cover layer may have a thickness within a range having a lower limit of 0.010 or 0.020 or 0.030 inches and an upper limit of 0.035 or 0.040 or 0.050 inches. The outer cover layer composition may have a material hardness of 62 Shore D or less, or less than 62 Shore D, or 60 Shore D or less, or less than 60 Shore D, or 55 Shore D or less, or less than 55 Shore D. The outer cover layer may have a thickness within a range having a lower limit of 0.010 or 0.020 or 0.025 inches and an upper limit of 0.035 or 0.040 or 0.050 inches.

In another embodiment, the cover may comprise an inner cover layer formed from an ionomeric composition and an outer cover layer formed from a thermoplastic composition selected from ionomer-, polyurethane-, and polyurea-based compositions. The inner cover layer composition may have a material hardness of from 60 or 62 or 65 Shore D to 65 or 70 or 72 Shore D. The inner cover layer may have a thickness within a range having a lower limit of 0.010 or 0.020 or 0.030 inches and an upper limit of 0.035 or 0.040 or 0.050 inches. The outer cover layer composition may have a material hardness of 62 Shore D or less, or less than 62 Shore D, or 60 Shore D or less, or less than 60 Shore D, or 55 Shore D or less, or less than 55 Shore D. The outer cover layer may have a thickness within a range having a lower limit of 0.010 or 0.020 or 0.025 inches and an upper limit of 0.035 or 0.040 or 0.050 inches.

In yet another embodiment, the cover is a dual- or multi-layer cover including an inner or intermediate cover layer formed from an ionomeric composition and an outer cover layer formed from a polyurethane- or polyurea-based composition. The ionomeric layer may have a surface hardness of 70 Shore D or less, or 65 Shore D or less, or less than 65 Shore D, or a Shore D hardness of from 50 to 65, or a Shore D hardness of from 57 to 60, or a Shore D hardness of 58, and a thickness within a range having a lower limit of 0.010 or 0.020 or 0.030 inches and an upper limit of 0.045 or 0.080 or 0.120 inches. The outer cover layer may be formed from a castable or reaction injection moldable polyurethane, polyurea, or copolymer or hybrid of polyurethane/polyurea. Such cover material may be thermosetting, but may be thermoplastic in other embodiments. The outer cover layer composition may have a material hardness of 85 Shore C or less, or 45 Shore D or less, or 40 Shore D or less, or from 25 Shore D to 40 Shore D, or from 30 Shore D to 40 Shore D. The outer cover layer may have a surface hardness within a range having a lower limit of 20 or 30 or 35 or 40 Shore D and an upper limit of 52 or 58 or 60 or 65 or 70 or 72 or 75 Shore D. The outer cover layer may have a thickness within a range having a lower limit of 0.010 or 0.015 or 0.025 inches and an upper limit of 0.035 or 0.040 or 0.045 or 0.050 or 0.055 or 0.075 or 0.080 or 0.115 inches.

Other golf ball layers of golf balls of the invention may be formed in some embodiments using a variety of application techniques. For example, at least some of the golf ball layers may be formed using compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, whereas RIM, liquid injection molding, and casting are employed on thermoset materials.

In one embodiment, a very thin moisture barrier layer may be covered with a castable thermoset or injection moldable thermoplastic material or any of the other cover materials discussed below. In this embodiment, the core may for example have a diameter of about 0.5 inches to about 1.64 inches and the cover layer thickness may range from about 0.02 inches to about 0.12 inches.

In this regard, covers may have one or more layers as well. The cover material should impart durability, toughness and tear-resistance to the ball. For example, polyurethane/polyurea compositions can be used in the cover layer, because they can provide the cover with high durability as well as a soft feel. In other embodiments, the cover may be made of polymers such as ethylene, propylene, butene-1 or hexane-1 based homopolymers and copolymers including functional monomers such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(ethylene vinyl alcohol), poly(tetrafluoroethylene) and their copolymers including functional comonomers and blends thereof.

In one embodiment, ionomer resins can be used as the cover material. These cross-linked polymers contain interchain ionic bonding as well as covalent bonding. The ionomer resins include, for example, a copolymer of ethylene and an acid group such as methacrylic or acrylic acid. Metal ions such as sodium, lithium, zinc, and magnesium are used to neutralize the acid groups in the polymer. Commercially available ionomer resins are known in the industry and include numerous resins sold under the trademarks, Surlyn.®. (DuPont) and Escor.® and Iotek.®. (Exxon). These ionomer resins are available in various grades and are identified based on the type of base resin, molecular weight, type of metal ion, amount of acid, degree of neutralization, additives, and other properties.

Non-limiting examples of suitable ionomers include partially neutralized ionomers, blends of two or more partially neutralized ionomers, highly neutralized ionomers, blends of two or more highly neutralized ionomers, and blends of one or more partially neutralized ionomers with one or more highly neutralized ionomers. Methods of preparing ionomers are well known, and are disclosed, for example, in U.S. Pat. No. 3,264,272, the entire disclosure of which is hereby incorporated herein by reference. The acid copolymer can be a direct copolymer wherein the polymer is polymerized by adding all monomers simultaneously, as disclosed, for example, in U.S. Pat. No. 4,351,931, the entire disclosure of which is hereby incorporated herein by reference. Alternatively, the acid copolymer can be a graft copolymer wherein a monomer is grafted onto an existing polymer, as disclosed, for example, in U.S. Patent Application Publication No. 2002/0013413, the entire disclosure of which is hereby incorporated herein by reference.

Examples of suitable partially neutralized acid polymers include, but are not limited to, Surlyn® ionomers, commercially available from E. I. du Pont de Nemours and Company; AClyn® ionomers, commercially available from Honeywell International Inc.; and Iotek® ionomers, commercially available from Exxon Mobil Chemical Company. Some suitable examples of highly neutralized ionomers (HNP) are DuPont® HPF 1000 and DuPont® HPF 2000, ionomeric materials commercially available from E. I. du Pont de Nemours and Company. In some embodiments, very low modulus ionomer- ("VLMI-") type ethylene-acid polymers are particularly suitable for forming the HNP, such as Surlyn® 6320, Surlyn® 8120, Surlyn® 8320, and Surlyn® 9320, commercially available from E. I. du Pont de Nemours and Company.

Any or each of core layers, intermediate/casing layers, and cover layers may be formed from ionomeric materials including blends of ionomers such as blends of HNP materials. The acid moieties of the HNP's, typically ethylene-based ionomers, are preferably neutralized greater than about 70%, more preferably greater than about 90%, and most preferably at least about 100%. The HNP's can be also be blended with a second polymer component, which, if containing an acid group, may also be neutralized. The second polymer component, which may be partially or fully neutralized, may comprise for example ionomeric copolymers and terpolymers, ionomer precursors, thermoplastics, polyamides, polycarbonates, polyesters, polyurethanes, polyureas, polyurethane/urea hybrids, thermoplastic elastomers, polybutadiene rubber, balata, metallocene-catalyzed polymers (grafted and non-grafted), single-site polymers, high-crystalline acid polymers, cationic ionomers, and the like. HNP polymers typically have a material hardness of between about 20 and about 80 Shore D, and a flexural modulus of between about 3,000 psi and about 200,000 psi.

Additional suitable materials for golf ball layers include polyurethanes; polyureas; copolymers and hybrids of polyurethane and polyurea; polyethylene, including, for example, low density polyethylene, linear low density polyethylene, and high density polyethylene; polypropylene; rubber-toughened olefin polymers; acid copolymers, e.g., (meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; ethylene vinyl acetates; ethylene methyl acrylates; polyvinyl chloride resins; polyamides, amide-ester elastomers, and graft copolymers of ionomer and polyamide, including, for example, Pebax.®. thermoplastic polyether block amides, commercially available from Arkema Inc; crosslinked transpolyisoprene and blends thereof; polyester-based thermoplastic elastomers, such as Hytrel.®., commercially available from E. I. du Pont de Nemours and Company; polyurethane-based thermoplastic elastomers, such as Elastollan.®., commercially available from BASF; synthetic or natural vulcanized rubber; and combinations thereof.

Thus, in one embodiment, the cover is a single layer formed from a composition selected from the group consisting of ionomers, polyester elastomers, polyamide elastomers, and combinations of two or more thereof. In a second embodiment, the cover may comprise a composition formed from a thermoplastic polyurethane, thermoset polyurethane, thermoplastic polyurea, or thermoset polyurea. In another version, the cover layer comprises a blend of from about 10% to about 90% by weight of the polyurea composition and from about 90% to about 10% of a polyurethane composition. In yet another embodiment, the cover layer comprises a blend of from about 10% to about 90% by weight of the polyurea composition and from about 90% to about 10% of another polymer or other material such as vinyl resins, polyesters, polyamides, and polyolefins.

When used as cover layer materials, polyurethanes, polyureas, and urea-urethane hybrids can be thermoset or thermoplastic. Thermoset materials can be formed into golf ball layers by conventional casting or reaction injection molding techniques. Thermoplastic materials can be formed into golf ball layers by conventional compression or injection molding techniques. Thermoplastic polyurethanes have minimal cross-linking; any bonding in the polymer network is primarily through hydrogen bonding or other physical mechanism. Because of their lower level of cross-linking, thermoplastic polyurethanes are relatively flexible. The cross-linking bonds in thermoplastic polyurethanes can be reversibly broken by increasing temperature such as during molding or extrusion. That is, the thermoplastic material softens when exposed to heat and returns to its original condition when cooled. On the other hand, thermoset polyurethanes become irreversibly set when they are cured. The cross-linking bonds are irreversibly set and are not broken when exposed to heat. Thus, thermoset polyurethanes, which typically have a high level of cross-linking, are relatively rigid.

Polyurethane cover compositions that can be used include those formed from the reaction product of at least one polyisocyanate and at least one curing agent. The curing agent can include, for example, one or more diamines, one or more polyols, or a combination thereof. The at least one polyisocyanate can be combined with one or more polyols to form a prepolymer, which is then combined with the at least one curing agent. Thus, when polyols are described herein they may be suitable for use in one or both components of the polyurethane material, that is, as part of a prepolymer and in the curing agent. The curing agent includes a polyol curing agent preferably selected from the group consisting of ethylene glycol; diethylene glycol; polyethylene glycol; propylene glycol; polypropylene glycol; lower molecular weight polytetramethylene ether glycol; 1,3-bis(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol; 1,5-pentanediol; 1,6-hexanediol; resorcinol-di-(.beta.-hydroxyethyl)ether; hydroquinone-di-(.beta.-hydroxyethyl)ether; trimethylol propane; and combinations thereof.

Suitable polyurethane cover compositions also include those formed from the reaction product of at least one isocyanate and at least one curing agent or the reaction product of at least one isocyanate, at least one polyol, and at least one curing agent. Preferred isocyanates include those selected from the group consisting of 4,4'-diphenylmethane diisocyanate, polymeric 4,4'-diphenylmethane diisocyanate, carbodiimide-modified liquid 4,4'-diphenylmethane diisocyanate, 4,4'-dicyclohexylmethane diisocyanate, p-phenylene diisocyanate, toluene diisocyanate, isophoronediisocyanate, p-methylxylene diisocyanate, m-methylxylene diisocyanate, o-methylxylene diisocyanate, and combinations thereof. Preferred polyols include those selected from the group consisting of polyether polyol, hydroxy-terminated polybutadiene, polyester polyol, polycaprolactone polyol, polycarbonate polyol, and combinations thereof. Preferred curing agents include polyamine curing agents, polyol curing agents, and combinations thereof. Polyamine curing agents are particularly preferred. Preferred polyamine curing agents include, for example, 3,5-dimethylthio-(2,4 or 2,6)-toluenediamine, or an isomer thereof; 3,5-diethyltoluene-(2,4 or 2,6)-diamine, or an isomer thereof; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); trimethylene glycol-di-p-aminobenzoate; polytetramethyleneoxide-di-p-aminobenzoate; N,N'-dialkyldiamino diphenyl methane; p,p'-methylene dianiline; phenylenediamine; 4,4'-methylene-bis-(2-chloroaniline); 4,4'-methylene-bis-(2,6-diethylaniline); 4,4'-diamino-3,3'-diethyl-5,5'-dimethyl diphenylmethane; 2,2',3,3'-tetrachloro diamino diphenylmethane; 4,4'-methylene-bis-(3-chloro-2,6-diethylaniline); and combinations thereof.

The cover composition is not limited by the use of a particular polyisocyanate. Suitable polyisocyanates include, but are not limited to, 4,4'-diphenylmethane diisocyanate ("MDI"), polymeric MDI, carbodiimide-modified liquid MDI, 4,4'-dicyclohexylmethane diisocyanate ("$H_{12}$MDI"), p-phenylene diisocyanate ("PPDI"), toluene diisocyanate ("TDI"), 3,3'-dimethyl-4,4'-biphenylene diisocyanate ("TODI"), isophoronediisocyanate ("IPDI"), hexamethylene diisocyanate ("HDI"), naphthalene diisocyanate ("NDI"); xylene diisocyanate ("XDI"); para-tetramethylxylene diisocyanate ("p-TMXDI"); meta-tetramethylxylene diisocyanate ("m-TMXDI"); trans-cyclohexane diisocyanate (CHDI); ethylene diisocyanate; propylene-1,2-diisocyanate; tetramethylene-1,4-diisocyanate; cyclohexyl diisocyanate; 1,6-hexamethylene-diisocyanate ("HDI"); dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate ("TMDI"), tetracene diisocyanate, naphthalene diisocyanate, anthracene diisocyanate; and combinations thereof. Polyisocyanates are known to those of ordinary skill in the art as having more than one isocyanate group, e.g., di-, tri-, and tetra-isocyanate. Preferably, the polyisocyanate is selected from MDI, PPDI, TDI, and combinations thereof. More preferably, the polyisocyanate includes MDI. It should be understood that, as used herein, the term "MDI" includes 4,4'-diphenylmethane diisocyanate, polymeric MDI, carbodiimide-modified liquid MDI, combinations thereof and, additionally, that the diisocyanate employed may be "low free monomer," understood by one of ordinary skill in the art to have lower levels of "free" monomer isocyanate groups than conventional diisocyanates, i.e., the compositions of the invention typically have less than about 0.1% free monomer groups. Examples of "low free monomer" diisocyanates include, but are not limited to Low Free Monomer MDI, Low Free Monomer TDI, and Low Free Monomer PPDI.

The at least one polyisocyanate may have less than 14% unreacted NCO groups. Preferably, the at least one polyisocyanate has no greater than 8.5% NCO, more preferably from 2.5% to 8.0%, or from 4.0% to 7.2%, or from 5.0% to 6.5%.

The cover composition is not limited by the use of a particular polyol. In one embodiment, the molecular weight of the polyol is from about 200 to about 6000. Exemplary polyols include, but are not limited to, polyether polyols, hydroxy-terminated polybutadiene (including partially/fully hydrogenated derivatives), polyester polyols, polycaprolactone polyols, and polycarbonate polyols. Particularly preferred are polytetramethylene ether glycol ("PTMEG"), polyethylene propylene glycol, polyoxypropylene glycol, and combinations thereof. The hydrocarbon chain can have saturated or unsaturated bonds and substituted or unsubstituted aromatic and cyclic groups. Preferably, the polyol includes PTMEG. Suitable polyester polyols include, but are not limited to, polyethylene adipate glycol, polybutylene adipate glycol, polyethylene propylene adipate glycol, ortho-phthalate-1,6-hexanediol, and combinations thereof. The hydrocarbon chain can have saturated or unsaturated bonds, or substituted or unsubstituted aromatic and cyclic groups. Suitable polycaprolactone polyols include, but are not limited to 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and combinations thereof. The hydrocarbon chain can have saturated or unsaturated bonds, or substituted or unsubstituted aromatic and cyclic groups. Suitable polycarbonates include, but are not limited to, polyphthalate carbonate. The hydrocarbon chain can have saturated or unsaturated bonds, or substituted or unsubstituted aromatic and cyclic groups.

Polyamine curatives are also suitable for use in the curing agent of polyurethane compositions and have been found to improve cut, shear, and impact resistance of the resultant balls. Preferred polyamine curatives include, but are not limited to 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); polytetramethyleneoxide-di-p-aminobenzoate; N,N'-dialkyldiamino diphenyl methane; p,p'-methylene dianiline ("MDA"); m-phenylenediamine ("MPDA"); 4,4'-methylene-bis-(2-chloroaniline) ("MOCA"); 4,4'-methylene-bis-(2,6-diethylaniline); 4,4'-diamino-3,3'-diethyl-5,5'-dimethyl diphenylmethane; 2,2',3,3'-tetrachloro diamino diphenylmethane; 4,4'-methylene-bis-(3-chloro-2,6-diethylaniline); trimethylene glycol di-p-aminobenzoate; and combinations thereof. Preferably, the curing agent includes 3,5-dimethylthio-2,4-toluenediamine and isomers thereof, such as ETHACURE 300. Suitable polyamine curatives, which include both primary and secondary amines, preferably have weight average molecular weights ranging from about 64 to about 2000.

At least one of a diol, triol, tetraol, or hydroxy-terminated curative may be added to the polyurethane composition. Suitable diol, triol, and tetraol groups include ethylene glycol; diethylene glycol; polyethylene glycol; propylene glycol; polypropylene glycol; lower molecular weight polytetramethylene ether glycol; 1,3-bis(2-hydroxyethoxy)benzene; 1,3-bis-[2-(2-hydroxyethoxy)ethoxy]benzene; 1,3-bis-{2-[2-(2-hydroxyethoxy) ethoxy]ethoxy}benzene; 1,4-butanediol; 1,5-pentanediol; 1,6-hexanediol; resorcinol-di-(4-hydroxyethyl)ether; hydroquinone-di-(4-hydroxyethyl) ether; 2-methyl-1,3-propanediol; 2-methyl-1,4-butanediol; monoethanolamine; diethanolamine; triethanolamine; monoisopropanolamine; diisopropanolamine; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; N,N,N',N'-tetra-(2-hydroxypropyl)- ethylene diamine; diethylene glycol bis-(aminopropyl) ether; 1,3-bis-[2-(2-hydroxyethoxy) ethoxy]cyclohexane; 2,2'-(1,4-phenylenedioxy)diethanol, 1,3-bis-{2-[2-(2-hydroxyethoxy) ethoxy]ethoxy}cyclohexane; trimethylolpropane; and combinations thereof. Preferred hydroxy-terminated curatives include ethylene glycol; diethylene glycol; 1,4-butanediol; 1,5-pentanediol; 1,6-hexanediol, trimethylol propane, and combinations thereof. Preferably, the hydroxy-terminated curative has a molecular weights ranging from about 48 to 3900. It should be understood that molecular weight, as used herein, is the absolute weight average molecular weight and would be understood as such by one of ordinary skill in the art.

Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane composition may be formed with a single curing agent.

Any method known to one of ordinary skill in the art may be used to combine the polyisocyanate, polyol, and curing agent. One commonly employed method, known in the art as a one-shot method, involves concurrent mixing of the polyisocyanate, polyol, and curing agent. This method results in a mixture that is inhomogeneous (more random) and affords the manufacturer less control over the molecular structure of the resultant composition. A preferred method of mixing is known as a pre-polymer method. In this method, the polyisocyanate and the polyol are mixed separately prior to addition of the curing agent. This method affords a more homogeneous mixture resulting in a more consistent polymer composition.

In the casting process, polyurethane, polyurea and/or polyurea/urethane compositions can be formed by chain-extending the a prepolymer with a single curing agent or blend of curing agents as described further below. The compositions of the present invention may be selected from among both thermoplastic and thermoset materials. In general, thermoplastic polyurethane compositions are typically formed by reacting the isocyanate blend and polyols at a 1:1 stoichiometric ratio. Similarly, thermoplastic polyurea compositions are typically formed by reacting the isocyanate blend and polyamines at a 1:1 stoichiometric ratio. Thermoset polyurethane compositions, on the other hand, are cross-linked polymers and are typically produced from the reaction of the isocyanate blend and polyols at normally a 1.05:1 stoichiometric ratio. Similarly, thermoset polyureas are typically produced from the reaction of the isocyanate blend and polyamines at normally a 1.05:1 stoichiometric ratio.

When the polyurethane prepolymer is reacted with hydroxyl-terminated curing agents during the chain-extending step, the resulting composition is essentially a pure polyurethane composition containing urethane linkages having the following general structure:

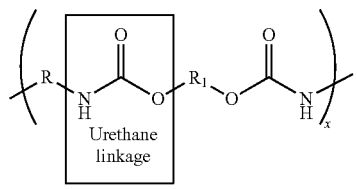

where x is the chain length, i.e., about 1 or greater, and R and $R_1$ are straight chain or branched hydrocarbon chain having about 1 to about 20 carbons.

And when the polyurea prepolymer is reacted with amine-terminated curing agents during the chain-extending step, as described above, the resulting composition is essentially a pure polyurea composition.

However, a polyurethane/urea hybrid will result when a polyurethane prepolymer is reacted with an amine-terminated curing agent during the chain-extending step, any excess isocyanate groups in the prepolymer will react with the amine groups in the curing agent and create urea linkages having the following general structure:

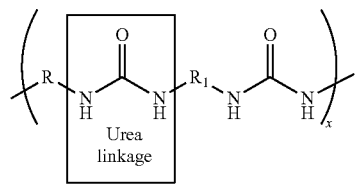

where x is the chain length, i.e., about 1 or greater, and R and $R_1$ are straight chain or branched hydrocarbon chain having about 1 to about 20 carbons.

Meanwhile, a polyurea-urethane hybrid will form when a polyurea prepolymer is reacted with a hydroxyl-terminated curing agent during the chain-extending step, any excess isocyanate groups in the prepolymer will react with the hydroxyl groups in the curing agent and create urethane linkages.

Catalysts may be employed to promote the reaction when producing the prepolymer or between prepolymer and chain-extender during the chain-extending step. Preferably, the catalyst is added to the reactants before producing the prepolymer. Suitable catalysts include, but are not limited to, bismuth catalyst; zinc octoate; stannous octoate; tin catalysts such as bis-butyltin dilaurate, bis-butyltin diacetate, stannous octoate; tin (II) chloride, tin (IV) chloride, bis-butyltin dimethoxide, dimethyl-bis[1-oxonedecyl)oxy]stannane, di-n-octyltin bis-isooctyl mercaptoacetate; amine catalysts such as triethylenediamine, triethylamine, and tributylamine; organic acids such as oleic acid and acetic acid; delayed catalysts; and mixtures thereof. The catalyst is preferably added in an amount sufficient to catalyze the reaction of the components in the reactive mixture. In one embodiment, the catalyst is present in an amount from about 0.001 percent to about 1 percent, and preferably 0.1 to 0.5 percent, by weight of the composition.

Suitable polyurethanes are further disclosed, for example, in U.S. Pat. Nos. 5,334,673, 6,506,851, 6,756,436, 6,867,279, 6,960,630, and 7,105,623, the entire disclosures of which are hereby incorporated herein by reference. Suitable polyureas are further disclosed, for example, in U.S. Pat. Nos. 5,484,870 and 6,835,794, and U.S. Patent Application No. 60/401,047, the entire disclosures of which are hereby incorporated herein by reference. Suitable polyurethane-urea cover materials include polyurethane/polyurea blends and copolymers comprising urethane and urea segments, as disclosed in U.S. Patent Application Publication No. 2007/0117923, the entire disclosure of which is hereby incorporated herein by reference.

When injection molding is used to form a golf ball layer, the layer composition is typically in a pelletized or granulated form that can be easily fed into the throat of an injection molding machine wherein it is melted and conveyed via a screw in a heated barrel at temperatures of from about 150° F. to about 600° F., preferably from about 200° F. to about 500° F. The molten composition is ultimately injected into a closed mold cavity, which may be cooled, at ambient or at an elevated temperature, but typically the mold is cooled to a temperature of from about 50° F. to about 70° F. After residing in the closed mold for a time of from 1 second to 300 seconds, preferably from 20 seconds to 120 seconds, the core and/or core plus one or more additional core or cover layers is removed from the mold and either allowed to cool at ambient or reduced temperatures or is placed in a cooling fluid such as water, ice water, dry ice in a solvent, or the like.

Castable reactive liquid polyurethanes and polyurea materials may be applied over the inner ball using a variety of application techniques such as casting, injection molding spraying, compression molding, dipping, spin coating, or flow coating methods that are well known in the art. In one embodiment, the castable reactive polyurethanes and polyurea material is formed over the core using a combination of casting and compression molding. Conventionally, compression molding and injection molding are applied to thermoplastic cover materials, whereas RIM, liquid injection molding, and casting are employed on thermoset cover materials.

U.S. Pat. No. 5,733,428, the entire disclosure of which is hereby incorporated by reference, discloses a method for forming a polyurethane cover on a golf ball core. Because this method relates to the use of both casting thermosetting and thermoplastic material as the golf ball cover, wherein the cover is formed around the core by mixing and introducing the material in mold halves, the polyurea compositions may also be used employing the same casting process.

For example, once a polyurea composition is mixed, an exothermic reaction commences and continues until the material is solidified around the core. It is important that the viscosity be measured over time, so that the subsequent steps of filling each mold half, introducing the core into one half and closing the mold can be properly timed for accomplishing centering of the core cover halves fusion and achieving overall uniformity. A suitable viscosity range of the curing urea mix for introducing cores into the mold halves is determined to be approximately between about 2,000 cP and about 30,000 cP, or within a range of about 8,000 cP to about 15,000 cP.

To start the cover formation, mixing of the prepolymer and curative is accomplished in a motorized mixer inside a mixing head by feeding through lines metered amounts of curative and prepolymer. Top preheated mold halves are filled and placed in fixture units using centering pins moving into apertures in each mold. At a later time, the cavity of a bottom mold half, or the cavities of a series of bottom mold halves, is filled with similar mixture amounts as used for the top mold halves. After the reacting materials have resided in top mold halves for about 40 to about 100 seconds, preferably for about 70 to about 80 seconds, a core is lowered at a controlled speed into the gelling reacting mixture.

A ball cup holds the shell through reduced pressure (or partial vacuum). Upon location of the core in the halves of the mold after gelling for about 4 to about 12 seconds, the vacuum is released allowing the core to be released. In one embodiment, the vacuum is released allowing the core to be released after about 5 seconds to 10 seconds. The mold halves, with core and solidified cover half thereon, are removed from the centering fixture unit, inverted and mated with second mold halves which, at an appropriate time earlier, have had a selected quantity of reacting polyurea prepolymer and curing agent introduced therein to commence gelling.

Similarly, U.S. Pat. No. 5,006,297 and U.S. Pat. No. 5,334,673 both also disclose suitable molding techniques that may be utilized to apply the castable reactive liquids employed in the present invention.

However, it is envisioned that layers of golf balls of the invention other than the very thin moisture barrier layer may be made by any known technique to those skilled in the art.

Cover compositions may also include one or more filler(s), such as coloring agents, fluorescent agents, whitening agents, antioxidants, dispersants, UV absorbers, light stabilizers, plasticizers, surfactants, compatibility agents, foaming agents, reinforcing agents, release agents, and the like.

Several suitable cover materials and constructions also include, but are not limited to, those disclosed in U.S. Patent Application Publication No. 2005/0164810, U.S. Pat. Nos. 5,919,100, 6,117,025, 6,767,940, and 6,960,630, and PCT Publications WO00/23519 and WO00/29129, the entire disclosures of which are hereby incorporated herein by reference.

The golf ball of this invention may have single-, dual-, or multi-layered covers preferably having an overall thickness within a range having a lower limit of 0.010 or 0.020 or 0.025 or 0.030 or 0.040 or 0.045 inches and an upper limit of 0.050 or 0.060 or 0.070 or 0.075 or 0.080 or 0.090 or 0.100 or 0.150 or 0.200 or 0.300 or 0.500 inches. In one embodiment, the cover is a single layer having a thickness of from 0.025 inches to 0.035 inches. Again, the cover hardness may be targeted depending on desired playing characteristics. As a general rule, all other things being equal, a golf ball having a relatively soft cover will spin more than a similarly constructed ball having a harder cover.

It is envisioned that golf balls of the invention may also incorporate conventional coating layer(s) for the purposes usually incorporated. For example, one or more coating layer may have a combined thickness of from about 0.1 μm to about 100 μm, or from about 2 μm to about 50 μm, or from about 2 μm to about 30 μm. Meanwhile, each coating layer may have a thickness of from about 0.1 μm to about 50 μm, or from about 0.1 μm to about 25 μm, or from about 0.1 μm to about 14 μm, or from about 2 μm to about 9 μm, for example.

In one embodiment, the subassembly is a single-piece core having an outside diameter of about 1.20 to about 1.65 inches. Preferably, the single-piece core has a diameter of about 1.62 inches. The core generally makes up a substantial portion of the ball, for example, the core may constitute at least about 90% of the ball. The hardness of the core may vary depending upon the desired properties of the ball.

One non-limiting example of such a construction is as follows. The core may be a single-piece polybutadiene core having a diameter of at least about 1.58 inches; moisture barrier monolayer film may have a thickness of from about 0.001 inches to about 0.007 inches; and a polyurethane cover may have a thickness of less than about 0.070 inches. The film has an nMVTR that is lower than the nMVTR of the polybutadiene core it surrounds, and also lower than of the polyurethane cover material nMVTR, thereby protecting the core from any moisture that penetrates through the polyurethane cover material to the moisture barrier film.

In other embodiments, the moisture barrier monolayer film is replaced with a moisture barrier bi-layer film or multi-layer film.

In another embodiment, the core may include a spherical inner core portion and surrounding outer core layer. In this dual or two-piece core, often referred to as the "center" of the ball, the inner core portion may have a diameter of about 0.5 to about 1.30 inches, more preferably 1.00 to 1.15 inches, and be relatively soft (that is, it may have a compression of less than the outer core layer). The outer core layer may have a thickness of about 0.20 to about 0.60 inches and be relatively hard. That is, the two-piece core or "center" of the ball, which constitutes the inner core and outer core layer, may have a total diameter of about 1.50 to about 1.64 inches, more preferably 1.510 to 1.620 inches, and a compression of about 80 to about 115, more preferably 85 to 110.

In one instance, the core is a two-piece core having a total diameter of about 1.40 inches to about 1.62 inches and comprising an inner core portion having a diameter of about 0.90 inches to about 1.20 inches, and an outer core portion having a thickness of about 0.21 to about 0.36 inches. In such a construction, the moisture barrier film has a thickness of from about 0.002 inches to about 0.008 inches, and the cover preferably has a thickness of less than about 0.070 inches, preferably less than about 0.040 inches. More preferably, the cover has a thickness of about 0.015 to 0.040 inches.

The following are additional examples of golf ball constructions. In a first example, a golf ball of the invention may include a single or multi-layered rubber-based core having a diameter of about 1.58", which is surrounded and encased by a very thin moisture barrier bi-layer film having a thickness of no greater than 0.009 inches and having an nMVTR of less than 5.0 g/(m$^2$·day), and consisting of an inner film layer of polyolefin-based vulcanized thermoplastic elastomer, namely Adv. Elastomer Santoprene®203-50, or ®201-87, or ®201-73, and an outer film layer of ethylene-based cycloolefin copolymer. In one embodiment, first and second pre-forms are made by heat-induced vacuum form molding, and then assembled about the core and compression molded. A polyurethane cover may be formed about the very thin moisture barrier film to complete the golf ball. The cover in this embodiment has a thickness of 0.045 inches. Embodiments are envisioned wherein the cover may be thermoset or thermoplastic material as desired. In an alternative embodiment, the polyolefin-based vulcanized thermoplastic elastomer film layer and the ethylene-based cycloolefin copolymer-containing film layer are reversed on the golf ball so that the latter is adjacent the core.

In second example, a golf ball of the invention may incorporate the same core and cover as included in the golf ball of the first example, except that in the second example, the very thin moisture barrier film layer has a thickness of about 0.005 inches, an nMVTR of less than 5.0 g/(m$^2$·day), and consists of thermoformed heat-induced pre-form film half shells each containing a two film layers, namely a film layer of PE AA copolymer, namely BASF Lucalen®A2910M or Lucalen®A3710MX (rather than being based on Santoprene®TPE sheets) and a film layer comprising ethylene-based cycloolefin copolymer.

In a third example, a golf ball of the invention may incorporate the same core and cover as included in the golf balls of the first and second examples, except that in the third example, the very thin moisture barrier film layer has a thickness of about 0.004 inches, an nMVTR of less than 5.0 g/(m$^2$·day), and consists of thermoformed heat-induced pre-form film half shells each containing a six layers, a five layer sheet of Dow Saranex®453 (LPDE/EVA/PVDC/EVA/LDPE (per sheet)) rather than Santoprene®TPE or Lucalen®A2910M (or Lucalen®A3710MX) and a sixth film layer comprising ethylene-based cycloolefin copolymer.

In a fourth example, a golf ball of the invention may include a single or multi-layered rubber-based core having a diameter of about 1.50". The core is surrounded by a three layer cover arrangement consisting of an ionomeric inner cover layer, surrounded and encased by a very thin moisture barrier film having a thickness of less than 0.009 inches and an nMVTR of less than 5.0 g/(m$^2$·day), and consisting of thermoformed heat-induced pre-form film half shells containing a single layer sheet of polyolefin-based vulcanized thermoplastic elastomer, namely Santoprene®TPE, surrounded by a film layer comprising ethylene-based cycloolefin copolymer, which is in turn surrounded by a polyurethane cover layer to complete the golf ball. In such an embodiment, the subassembly consists of the single or multi-layered rubber-based core surrounded by the ionomeric inner cover layer, and the heat-induced pre-form film half shells can be heat-induced compression molded thereabout. The cover in this embodiment, excluding the very thin moisture barrier film layer, has a thickness of 0.030 inches.

In a fifth example, a golf ball of the invention may incorporate the same core and cover arrangement as the golf ball of the third example, except that in this fifth example, the very thin moisture barrier film has a thickness of about 0.005 inches, an nMVTR of less than 5.0 g/(m$^2$·day), and consists of thermoformed heat-induced pre-form film half shells each containing a single layer sheet of PE AA copolymer, namely Lucalen®A2910M or Lucalen®A3710MX, rather than being based on Santoprene®TPE sheets, surrounded by the film layer comprising ethylene-based cycloolefin copolymer.

In a sixth example, a golf ball of the invention may incorporate the same core and cover as included in the golf balls of the fourth and fifth examples, except that in the sixth example, the very thin moisture barrier film layer has a thickness of about 0.004 inches, an nMVTR of less than 5.0 g/(m$^2$·day), and consists of thermoformed heat-induced pre-form film half shells each containing a five layer sheet of Dow Saranex®453 (LPDE/EVA/PVDC/EVA/LDPE (per sheet)) rather than Santoprene®TPE or Lucalen®A2910M (or Lucalen®A3710MX), surrounded by the film layer comprising ethylene-based cycloolefin copolymer.

It is envisioned that in each of the aforementioned examples, the ethylene-based cycloolefin copolymer-containing film layer may consist entirely of the ethylene-based cycloolefin copolymer or may comprise a blend of the ethylene-based cycloolefin copolymer and at least one thermoset or thermoplastic polymer or composition.

Advantageously, a single very thin moisture barrier film having any number of individual layers within the film should sufficiently protect all inner layers of a golf ball construction from moisture penetration without changing golf ball characteristics and possessing the adhesion properties and elongation necessary to produce a durable golf ball.

In the present invention, "compression" is measured according to a known procedure, using an Atti compression test device, wherein a piston is used to compress a ball against a spring. The travel of the piston is fixed and the deflection of the spring is measured. The measurement of the deflection of the spring does not begin with its contact with the ball; rather, there is an offset of approximately the first 1.25 mm (0.05 inches) of the spring's deflection. Cores having a very low stiffness will not cause the spring to deflect by more than 1.25 mm and therefore have a zero compression measurement. The Atti compression tester is designed to measure objects having a diameter of 1.680 inches; thus, smaller objects, such as golf ball cores, must be shimmed to a total height of 1.680 inches to obtain an accurate reading. Conversion from Atti compression to Riehle (cores), Riehle (balls), 100 kg deflection, 130-10 kg deflection or effective modulus can be carried out according to the formulas given in J. Dalton.

In a golf ball if the invention, Coefficient of Restitution or CoR is determined according to a known procedure, wherein a golf ball or golf ball subassembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. CoR is then calculated as the ratio of the outgoing transit time period to the incoming transit time period, $CoR=V_{out}/V_{in}=T_{in}/T_{out}$. The CoR value can be targeted, for example, by varying the core peroxide and antioxidant types and amounts as well as the cure temperature and duration.

The surface hardness of a golf ball layer is obtained from the average of a number of measurements taken from opposing hemispheres, taking care to avoid making measurements on the parting line of the core or on surface defects such as holes or protrusions. Hardness measurements are made pursuant to ASTM D-2240 "Indentation Hardness of Rubber and Plastic by Means of a Durometer." Because of the curved surface of the golf ball layer, care must be taken to ensure that the golf ball or golf ball subassembly is centered under the durometer indentor before a surface hardness reading is obtained. A calibrated digital durometer, capable of reading to 0.1 hardness units, is used for all hardness measurements. The digital durometer must be attached to and its foot made parallel to the base of an automatic stand. The weight on the durometer and attack rate conforms to ASTM D-2240. It should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other.

Examples of yet other materials which may be suitable for incorporating and coordinating in order to target and achieve desired playing characteristics or feel include plasticized thermoplastics, polyalkenamer compositions, polyester-based thermoplastic elastomers containing plasticizers, transparent or plasticized polyamides, thiolene compositions, poly-amide and anhydride-modified polyolefins, organic acid-modified polymers, and the like.

Golf balls of the present invention preferably have a moment of inertia ("MOI") of 70-95 g·cm$^2$, preferably 75-93 g·cm$^2$, and more preferably 76-90 g·cm$^2$. For low MOI embodiments, the golf ball preferably has an MOI of 85 g·cm$^2$ or less, or 83 g·cm$^2$ or less. For high MOI embodiment, the golf ball preferably has an MOI of 86 g·cm$^2$ or greater, or 87 g·cm$^2$ or greater. MOI is measured on a model MOI-005-104 Moment of Inertia Instrument manufactured by Inertia Dynamics of Collinsville, Conn. The instrument is connected to a PC for communication via a COMM port and is driven by MOI Instrument Software version #1.2.

Thermoset and thermoplastic layers herein may be treated in such a manner as to create a positive or negative hardness gradient. In golf ball layers of the present invention wherein a thermosetting rubber is used, gradient-producing processes and/or gradient-producing rubber formulation may be employed. Gradient-producing processes and formulations are disclosed more fully, for example, in U.S. patent application Ser. No. 12/048,665, filed on Mar. 14, 2008; Ser. No. 11/829,461, filed on Jul. 27, 2007; Ser. No. 11/772,903, filed Jul. 3, 2007; Ser. No. 11/832,163, filed Aug. 1, 2007; Ser. No. 11/832,197, filed on Aug. 1, 2007; the entire disclosure of each of these references is hereby incorporated herein by reference.

It is understood that the golf balls of the invention incorporating at least one very thin moisture barrier film of thermoformed first and second heat-induced pre-form film half shells as described and illustrated herein represent only some of the many embodiments of the invention. It is appreciated by those skilled in the art that various changes and additions can be made to such golf balls without departing from the spirit and scope of this invention. It is intended that all such embodiments be covered by the appended claims.

A golf ball of the invention may further incorporate indicia, which as used herein, is considered to mean any symbol, letter, group of letters, design, or the like, that can be added to the dimpled surface of a golf ball.

Golf balls of the present invention will typically have dimple coverage of 60% or greater, preferably 65% or greater, and more preferably 75% or greater. It will be appreciated that any known dimple pattern may be used with any number of dimples having any shape or size. For example, the number of dimples may be 252 to 456, or 330 to 392 and may comprise any width, depth, and edge angle. The parting line configuration of said pattern may be either a straight line or a staggered wave parting line (SWPL), for example.

In any of these embodiments the single-layer core may be replaced with a two or more layer core wherein at least one core layer has a hardness gradient.

Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

Although the golf ball of the invention has been described herein with reference to particular means and materials, it is to be understood that the invention is not limited to the particulars disclosed and extends to all equivalents within the scope of the claims.

What is claimed is:

1. A golf ball comprising:
a subassembly;
a moisture barrier multi-layer film having a thickness of up to 0.009 inches disposed about and adjacent to an outer surface of the subassembly wherein at least one film layer of the moisture barrier multi-layer film comprises an ethylene-based cycloolefin copolymer; and
at least one outer layer disposed about an outer surface of the moisture barrier multi-layer film and having a moisture vapor transmission rate that is greater than a moisture vapor transmission rate of the moisture barrier multi-layer film;
wherein the moisture barrier multi-layer film consists of five film layers;
wherein adjacent film layers comprise at least one different ingredient;
wherein a first film layer consists of a linear low density polyethylene composition, the second film layer comprises at least one of an ethylene vinyl acetate composition and a polyvinylidene chloride composition, the third film layer comprises at least one ethylene-based cycloolefin copolymer, the fourth film layer comprises at least one of an ethylene vinyl acetate composition and polyvinylidene chloride composition, and a fifth film layer consists of a linear low density polyethylene composition.

2. The golf ball of claim 1, wherein the ethylene-based cycloolefin copolymer is blended with at least one of a thermoset and thermoplastic polymer.

3. The golf ball of claim 2, wherein the thermoset or thermoplastic polymer is selected from the group consisting of maleic anhydride grafted polyolefins, high density polyethylenes, low density polyethylenes, very low density polyethylenes, ethylene-vinyl acetates, polypropylenes, polyamides, polyesters, ethylene vinyl acetates, polyvinylidene chlorides, polychlorotrifluoroethylenes, thermoplastic polyurethanes, thermoset urethanes, thermoset rubbers, and combinations thereof.

4. The golf ball of claim 2, wherein the ethylene-based cycloolefin copolymer is blended with at least one linear low density polyethylene.

5. The golf ball of claim 2, wherein the thermoset or thermoplastic polymer is included in amount no greater than 35% by weight of the total weight of the blend.

6. The golf ball of claim 1, wherein the outer layer is a cover, and the subassembly is a core having an nMVTR that is greater than the nMVTR of the moisture barrier multi-layer film.

7. The golf ball of claim 1, wherein the moisture barrier multi-layer film has an nMVTR of less than about 5.0 g/(m$^2$·day).

* * * * *